United States Patent
Israel et al.

(10) Patent No.: US 7,161,939 B2
(45) Date of Patent: Jan. 9, 2007

(54) METHOD AND SYSTEM FOR SWITCHING AMONG INDEPENDENT PACKETIZED AUDIO STREAMS

(75) Inventors: David Israel, Santa Clara, CA (US); Arthur Irvin Laursen, Diablo, CA (US); Serkan Recep Dost, Walnut Creek, CA (US)

(73) Assignee: IP Unity, Milpitas, CA (US)

(*) Notice: Subject to any disclaimer, the term of this patent is extended or adjusted under 35 U.S.C. 154(b) by 495 days.

(21) Appl. No.: 09/893,743

(22) Filed: Jun. 29, 2001

(65) Prior Publication Data

US 2003/0002477 A1    Jan. 2, 2003

(51) Int. Cl.
H04L 12/28 (2006.01)
H04L 12/56 (2006.01)
H04J 15/00 (2006.01)
H04J 3/06 (2006.01)

(52) U.S. Cl. ............... 370/389; 370/464; 370/503
(58) Field of Classification Search ............... 381/2; 370/259, 357, 353, 389, 464, 503, 509; 379/88.12, 379/88.22, 93.01, 201.01, 242, 258
See application file for complete search history.

(56) References Cited

U.S. PATENT DOCUMENTS

| 5,436,896 | A |   | 7/1995  | Anderson et al. ........ 370/260 |
|-----------|---|---|---------|---------------------------------|
| 5,963,547 | A |   | 10/1999 | O'Neil et al.                    |
| 5,983,192 | A |   | 11/1999 | Botzko et al. ........... 704/500 |
| 6,084,855 | A | * | 7/2000  | Soirinsuo et al. ........ 370/235 |
| 6,118,790 | A | * | 9/2000  | Bolosky et al. ........... 370/468 |
| 6,118,864 | A |   | 9/2000  | Chang et al. ............. 379/225 |
| 6,128,649 | A |   | 10/2000 | Smith et al.                     |
| 6,141,597 | A |   | 10/2000 | Botzko et al.                    |
| 6,263,371 | B1|   | 7/2001  | Geagan et al.                    |
| 6,282,192 | B1| * | 8/2001  | Murphy et al. ............ 370/352 |
| 6,282,193 | B1|   | 8/2001  | Hluchyj ................... 370/356 |
| 6,404,745 | B1|   | 6/2002  | O'Neil ..................... 370/260 |
| 6,421,338 | B1|   | 7/2002  | Byers ...................... 370/352 |
| 6,466,550 | B1|   | 10/2002 | Foster ..................... 370/261 |
| 6,567,419 | B1|   | 5/2003  | Yarlagadda ............... 370/466 |
| 6,584,098 | B1| * | 6/2003  | Dutnall .................... 370/354 |
| 2001/0030958 | A1 |   | 10/2001 | Kichise ................... 370/352 |
| 2002/0075850 | A1 | * | 6/2002 | Cruz et al. ............... 370/352 |

(Continued)

FOREIGN PATENT DOCUMENTS

EP    1 113 657    7/2001

OTHER PUBLICATIONS

International Search Report for Appl. No. PCT/US02/20359, issued Feb. 4, 2003.

(Continued)

*Primary Examiner*—Kevin C. Harper
(74) *Attorney, Agent, or Firm*—Sterne Kessler Goldstein & Fox PLLC

(57) ABSTRACT

The present invention provides a method and system for noiselessly switching between independent audio streams. Such noiseless switching preserves valid RTP information at the time of switch over. For established VOIP calls, the present invention can noiselessly switch audio from one audio source to another. A switch directs audio data from multiple audio sources to a network interface controller. The switch can be a cell switch or a packet switch. The audio sources can be internal audio sources and/or external audio sources. An egress audio controller controls the operation of internal audio sources, the switch and the network interface controller to carry out noiseless switching according to the present invention. Certain call events which involve additional audio trigger a noiseless switch over.

31 Claims, 19 Drawing Sheets

U.S. PATENT DOCUMENTS

| | | | |
|---|---|---|---|
| 2002/0075879 A1* | 6/2002 | Ramey | 370/401 |
| 2002/0103919 A1 | 8/2002 | Hannaway | |
| 2002/0118805 A1* | 8/2002 | Miller et al. | 379/88.19 |
| 2002/0122430 A1* | 9/2002 | Haberman et al. | 370/429 |
| 2002/0133247 A1 | 9/2002 | Smith et al. | |
| 2002/0170067 A1 | 11/2002 | Norstrom et al. | |
| 2003/0009717 A1* | 1/2003 | Fukushima et al. | 714/748 |
| 2003/0045957 A1* | 3/2003 | Haberman et al. | 700/94 |
| 2003/0053429 A1* | 3/2003 | Choi et al. | 370/331 |
| 2004/0025186 A1* | 2/2004 | Jennings et al. | 725/93 |

OTHER PUBLICATIONS

Collins, D., "Carrier Grade Voice Over IP", McGraw-Hill Companies, Inc., New York, NY, 2001 (entire book provided).

Wolter, Charlotte, "Serving the Media—new Type of Product Will Turbocharge Voice, Audio and Video Apps," *Sounding Board—HP Communications Markets and Technology,* posted Apr. 2001.

Michael, Bill, "Network Based Media Servers: The New Generation," *Communications Convergence.com,* Apr. 5, 2001, internet address: http://www.computertelephony.com/article/CTM20010326S0007, Aug. 17, 2001; 5 pages.

Prasad, R.V. et al., "Automatic Addition And Deletion Of Clients In VoIP Conferencing", *Computers and Communications, 2001 Proceedings, Sixth IEEE Symposium On Jul. 3-5, 2001,* pp. 386-391.

Anerousis, N. et al., "Tops: An Architecture For Telephony Over Packet Networks", *IEEE Journal On Selected Areas In Communications,* IEEE Inc., New York, vol. 17, No. 1, Jan. 1999, pp. 91-107.

European Search Report issued in EP Appl. No. 02749672.8 on Nov. 2, 2005, 5 pages.

Mahy/Cisco Campbell/Dynamicsoft Johnston/Worldcom Petrie/Pingtel Rosenberg/Dynamicsoft Sparks/Dynamicsoft: "A Multi-party Application Framework for SIP" IETF Standards-Working-Draft, Internet Engineering Task Force, IETF, Feb. 2002, p. 1-43.

Jack Brassil, et al., "Enhancing Internet Streaming Media With Cueing Protocols", IEEE InfoCom 2001, pp. 95-103.

European Search Report for Application No. 02749672.8-2416, dated Jan. 18, 2006.

* cited by examiner

METHOD AND SYSTEM FOR SWITCHING AMONG INDEPENDENT PACKETIZED AUDIO STREAMS

BACKGROUND OF THE INVENTION

1. Field of the Invention

The invention relates generally to audio communication over a network.

2. Background Art

Audio has long been carried in telephone calls over networks. Traditional circuit-switched time division multiplexing (TDM) networks including public-switched telephone networks (PSTN) and plain old telephone networks (POTS) were used. These circuit-switched networks establish a circuit across the network for each call. Audio is carried in analog and/or digital form across the circuit in real-time.

The emergence of packet-switched networks, such as the local area networks (LANs), and the Internet, now requires that audio be carried digitally in packets. Audio can include but is not limited to voice, music, or other type of audio data. Voice over Internet Protocol systems (also called Voice over IP or VOIP systems) transport the digital audio data belonging to a telephone call in packets over packet-switched networks instead of traditional circuit-switched networks. In one example, a VOIP system forms two or more connections using Transmission Control Protocol/Internet Protocol (TCP/IP) addresses to accomplish a connected telephone call. Devices that connect to a VOIP network must follow standard TCP/IP packet protocols in order to interoperate with other devices within the VOIP network. Examples of such devices are IP phones, integrated access devices, media gateways, and media servers.

A media server is often an endpoint in a VOIP telephone call. The media server is responsible for ingress and egress audio streams, that is, audio streams which enter and leave a media server respectively. The type of audio produced by a media server is controlled by the application that corresponds to the telephone call such as voice mail, conference bridge, interactive voice response (IVR), speech recognition, etc. In many applications, the produced audio is not predictable and must vary based on end user responses. Words, sentences, and whole audio segments such as music must be assembled dynamically in real time as they are played out in audio streams.

Packet-switched networks, however, can impart delay and jitter in a stream of audio carried in a telephone call. A real-time transport protocol (RTP) is often used to control delays, packet loss and latency in an audio stream played out of a media server. The audio stream can be played out using RTP over a network link to a real-time device (such as a telephone) or a non-real-time device (such as an email client in unified messaging). RTP operates on top of a protocol such as the User Datagram Protocol (UDP) which is part of the IP family. RTP packets include among other things a sequence number and a timestamp. The sequence number allows a destination application using RTP to detect the occurrence of lost packets and to ensure a correct order of packets are presented to a user. The timestamp corresponds to the time at which the packet was assembled. The timestamp allows a destination application to ensure synchronized play-out to a destination user and to calculate delay and jitter. See, D. Collins, *Carrier Grade Voice over IP*, Mc-Graw Hill: United States, Copyright 2001, pp. 52–72, the entire book of which is incorporated in its entirety herein by reference.

A media server at an endpoint in a VOIP telephone call uses protocols such as RTP to improve communication quality for a single audio stream. Such media servers, however, have been limited to outputting a single audio stream of RTP packets for a given telephone call.

BRIEF SUMMARY OF THE INVENTION

As the use of audio networking increases and the number of users and applications rise, there is an increasing need for multiple audio streams even in a given telephone call. The inventors recognized that multiple audio streams need to be switched dynamically without introducing RTP errors in calls placed in an audio networking environment such as a voice over IP network. Such RTP errors can cause unwanted noises such as clicks, pops, etc.

The present invention provides a method and system for noiselessly switching between independent audio streams. Such noiseless switching preserves valid RTP information at the time of switch over. For established VOIP calls, the present invention can noiselessly switch audio from one audio source to another. This switching system is dynamic and can scale to handle many calls.

In embodiments of the present invention, a switch is used to direct audio data from multiple audio sources to a network interface controller. The switch can be a cell switch or a packet switch. The audio sources can be internal audio sources and/or external audio sources. The network interface controller (NIC) can be any interface with an IP network and includes one or more packet processors. An egress audio controller controls the operation of internal audio sources, the switch and the network interface controller to carry out noiseless switching according to the present invention.

In one feature of the invention, priority information is used by a network interface controller to determine which audio stream from an internal or external audio source is transmitted in an established VOIP telephone call. Consider the case of two internal audio sources. The audio sources generate respective audio streams of internal egress packets for one destination egress audio channel. In one embodiment, each internal egress packet includes a payload carrying audio and control header information. The control header information has priority information. This priority information is then used by a network interface controller to determine which audio stream is transmitted because only one RTP stream can be output at a given time for each VOIP call.

In one feature of the invention, the internal egress packets are smaller than IP packets and consist of payload and control header information only. In this way, processing work required to create complete IP packets need not be carried out by internal audio sources such as DSPs but is distributed to the packet processors in the network interface controller.

According to further feature, a cell switch is used which is a fully meshed cell switch such as an ATM cell switch that has plenty of available bandwidth. The internal egress packets for the different audio streams are converted to cells. The cell switch combines merged cells from different sources and delivers them across a switched virtual circuit (SVC) to a NIC. The SVC is associated with one egress output audio channel serving an established telephone call.

In one embodiment, an egress audio controller is used to control noiseless switching of audio in VOIP telephone calls. This noiseless switching according to the present invention is also referred to herein as a "noiseless switch over." In one embodiment, noiseless switch over of additional audio is carried out for calls in which this service is available. In this way, an extra charge may be made for providing a noiseless switch over service. In other embodiments, noiseless switch over is performed for any call.

Certain call events which involve additional audio trigger the noiseless switch over. This noiseless switch over is carried out using the noiseless switching system and method of the present invention. Examples of call events include but are not limited to the following conditions: an emergency condition, a call signaling condition, a call event based on callee or caller information, or a request for different audio information. The request for audio information can be any audio request such as a request for advertisements, news sports, financial, music or other audio content.

Audio sources can generate any type of audio. For example, an audio stream of egress packets can include audio payloads representing voice, music, tones, and/or any other sound.

The egress audio controller can be a stand-alone unit or a part of a call control and audio feature manager in an audio processing platform. The present invention can be implemented in a media server, audio processor, router, packet switch, or audio processing platform.

Another embodiment involves the switching of audio streams including an audio stream from an external audio source. In this case, a NIC receives IP packets containing the audio stream and converts the IP packets to internal egress packets. At this point, the internal egress packets are processed as if they were generated by an internal audio source. The internal egress packets may include priority information. The internal egress packets may be sent as packets or cells across a SVC through a switch to the NIC. When the external audio stream has a relatively high priority and switch over is to proceed, a packet processor at the NIC generates IP packets with synchronized header information (such as RTP information) and sends the IP packets to a destination device.

In one embodiment, a noiseless switch over system according to the invention involves the switching of audio streams only from internal audio sources such as DSPs. In another embodiment, a noiseless switch over system according to the invention involves the switching of audio streams from internal audio sources and external audio sources. In another embodiment, a noiseless switch over system according to the invention involves the switching of audio streams only from external audio sources in which case the switch over system acts a general switch for audio streams and no internal DSPs are required.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 6A is diagram of a noiseless switch over system that carries out cell switching of independent egress audio streams generated by internal audio sources according to an embodiment of the present invention.

FIG. 6B is diagram of audio data flow in a noiseless switch over system that carries out cell switching of independent egress audio streams generated by internal audio sources according to an embodiment of the present invention.

FIG. 6C is diagram of a noiseless switch over system that carries out cell switching between independent egress audio streams generated by internal and/or external audio sources according to an embodiment of the present invention.

FIG. 6D is diagram of audio data flow in a noiseless switch over system that carries out cell switching between independent egress audio streams generated by internal and/or external audio sources according to an embodiment of the present invention.

FIG. 6E is diagram of audio data flow in a noiseless switch over system that carries out packet switching between independent egress audio streams generated by internal and/or external audio sources according to an embodiment of the present invention.

FIG. 6F is diagram of a noiseless switch over system that carries out switching between independent egress audio streams generated by external audio sources according to an embodiment of the present invention.

Figure 1:
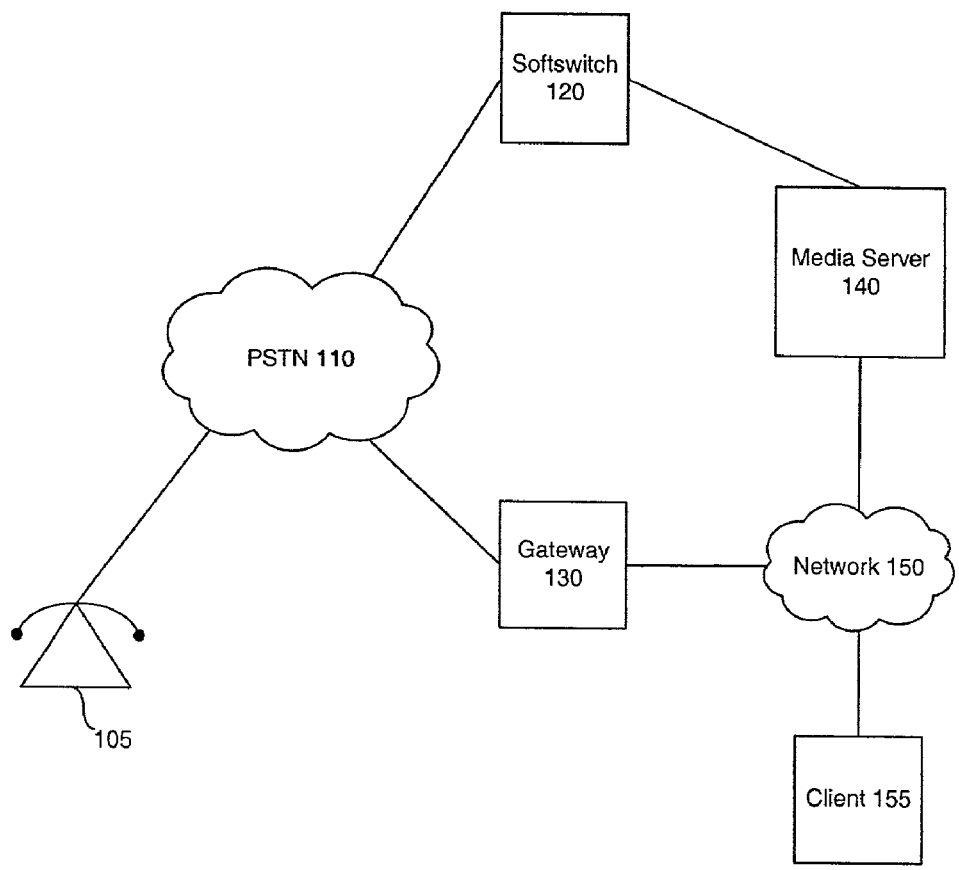
FIG. 1 is a diagram of a media server in a voice over the Internet example environment according to the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

I. Overview and Discussion
II. Terminology
III. Audio Networking Environment
IV. Media Server, Services and Resources V. Audio Processing Platform with a Packet/Cell Switch for Noiseless Switching of Independent Audio Streams
VI. Example Audio Processing Platform Implementation
VII. Call Control and Audio Feature Manager
VIII. Audio Processing Platform Operation
   A. Ingress Audio Streams
   B. Egress Audio Streams
IX. Noiseless Switching of Egress Audio Streams
   A. Cell Switch—Internal Audio Sources
   B. Packets
   1. IP Packets with RTP information
   2. Internal Egress Packets
   C. Priority Levels
   D. Noiseless Fully Meshed Cell Switch
   E. Two-Stage Egress Switching
   F. Call Event Triggering Noiseless Switch Over
   G. Audio Data Flow
   H. Other Embodiments
X. Control Logic

XI. CONCLUSION

I. Overview and Discussion

The present invention provides a method and system for noiselessly switching between independent audio streams. Certain call events which involve additional audio trigger the noiseless switch over. This noiseless switch over allows appropriate words, sentences, tones, music, or other types of audio free of annoying delays, pauses, or interruptions to be inserted into established real-time VOIP calls.

II. Terminology

To more clearly delineate the present invention, an effort is made throughout the specification to adhere to the following term definitions as consistently as possible.

The term noiseless according to the present invention refers to switching between independent audio streams where packet sequence information is preserved. The term synchronized header information refers to packets having headers where packet sequence information is preserved. Packet sequence information can include but is not limited to valid RTP information.

The term digital signal processor (DSP) includes but is not limited to a device used to code or decode digitized voice samples according to a program or application service.

The term digitized voice or voice includes but is not limited to audio byte samples produced in a pulse code modulation (PCM) architecture by a standard telephone circuit compressor/decompressor (CODEC).

The term packet processor refers to any type of packet processor that creates packets for a packet-switched network. In one example, a packet processor is a specialized microprocessor designed to examine and modify Ethernet packets according to a program or application service.

The term packetized voice refers to digitized voice samples carried within a packet.

The term real time protocol (RTP) stream of audio refers to the sequence of RTP packets associated with one channel of packetized voice.

The term switched virtual circuit (SVC) refers to a temporary virtual circuit that is set up and used only as long as data is being transmitted. Once the communication between the two hosts is complete, the SVC disappears. In contrast, a permanent virtual circuit (PVC) remains available at all times.

III. Audio Networking Environment

The present invention can be used in any audio networking environment. Such audio networking environments can include but are not limited to a wide area and/or local area network environment. In example embodiments, the present invention is incorporated within an audio networking environment as a stand-alone unit or as part of a media server, packet router, packet switch or other network component. For brevity, the present invention is described with respect to embodiments incorporated in a media server.

Media servers deliver audio on network links over one or more circuit-switched and/or packet-switched networks to local or remote clients. A client can be any type of device that handles audio including but not limited to a telephone, cellular phone, personal computer, personal data assistant (PDA), set-top box, console, or audio player. FIG. 1 is a diagram of a media server 140 in an voice over the Internet example environment according to the present invention. This example includes a telephone client 105, public-switched telephone network (PSTN) 110, softswitch 120, gateway 130, media server 140, packet-switched network(s) 150, and computer client 155. Telephone client 105 is any type of phone (wired or wireless) that can send and receive audio over PSTN 110. PSTN 110 is any type of circuit-switched network(s). Computer client 155 can be a personal computer.

Telephone client 105 is coupled through a public-switched telephone network (PSTN) 110, gateway 130 and network 150 to media server 140. In this example, call signaling and control is separated from the media paths or links that carry audio. Softswitch 120 is provided between PSTN 110 and media server 140. Softswitch 120 supports call signaling and control to establish and remove voice calls between telephone client 105 and media server 140. In one example, softswitch 120 follows the Session Initiation Protocol (SIP). Gateway 130 is responsible for converting audio passing to and from PSTN 110 and network 150.

This can include a variety of well-known functions such as translating a circuit-switched telephone number to an Internet Protocol (IP) address and vice versa.

Computer client 155 is coupled over network 150 to media server 140. A media gateway controller (not shown) can also use SIP to support call signaling and control to establish and breakdown links such as voice calls between computer client 155 and media server 140. An application server (not shown) can also be coupled to media server 140 to support VOIP services and applications.

The present invention is described in terms of these example environments. Description in these terms is provided for convenience only. It is not intended that the invention be limited to application in these example environments involving a media server, router, switch, network component, or stand-alone unit within a network. In fact, after reading the following description, it will become apparent to a person skilled in the relevant art how to implement the invention in alternative environments known now or developed in the future.

IV. Media Server, Services and Resources

Figure 2:
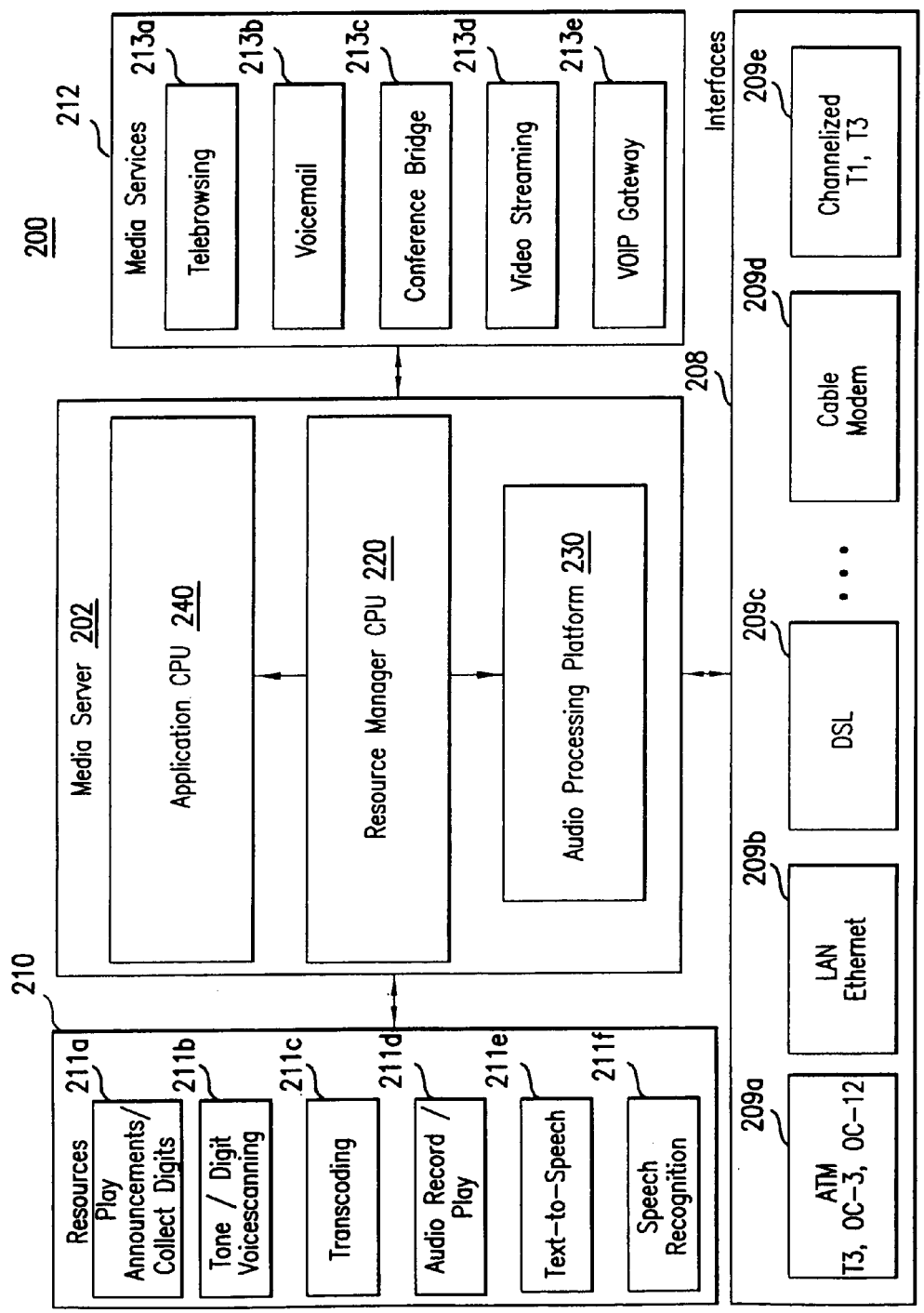
FIG. 2 is a diagram of an example media server including media services and resources according to the present invention.

FIG. 2 is a diagram of an example media platform 200 according to one embodiment the present invention. Platform 200 provides scalable VOIP telephony. Media platform 200 includes a media server 202 coupled to resource(s) 210, media service(s) 212, and interface(s) 208. Media server 202 provides resources 210 and services 212. Resources 210 include, but are not limited to modules 211a–f, as shown in FIG. 2. Resource modules 211a–f include conventional resources such as play announcements/collect digits IVR resources 211a, tone/digit voice scanning resource 211b, transcoding resource 211c, audio record/play resource 211d, text-to-speech resource 211e, and speech recognition resource 211f. Media services 212 include, but are not limited to, modules 213a–e, as shown in FIG. 2. Media services modules 213a–e include conventional services such as telebrowsing 213a, voice mail service 213b, conference bridge service 213c, video streaming 213d, and a VOIP gateway 213e.

Media server 202 includes an application central processing unit (CPU) 240, a resource manager CPU 220, and an audio processing platform 230. Application CPU 240 is any processor that supports and executes program interfaces for applications and applets. Application CPU 240 enables platform 200 to provide one or more of the media services 212. Resource manager CPU 220 is any processor that controls connectivity between resources 210 and the application CPU 210 and/or audio processing platform 230. Audio processing platform 230 provides communications connectivity with one or more of the network interfaces 208. Media platform 200 through audio processing platform 230 receives and transmits information via network interface 208. Interface 208 can include, but it not limited to, Asynchronous Transfer Mode (ATM) 209a, local area network (LAN) Ethernet 209b, digital subscriber line (DSL) 209c, cable modem 209d, and channelized T1–T3 lines 209e.

Figure 3A:
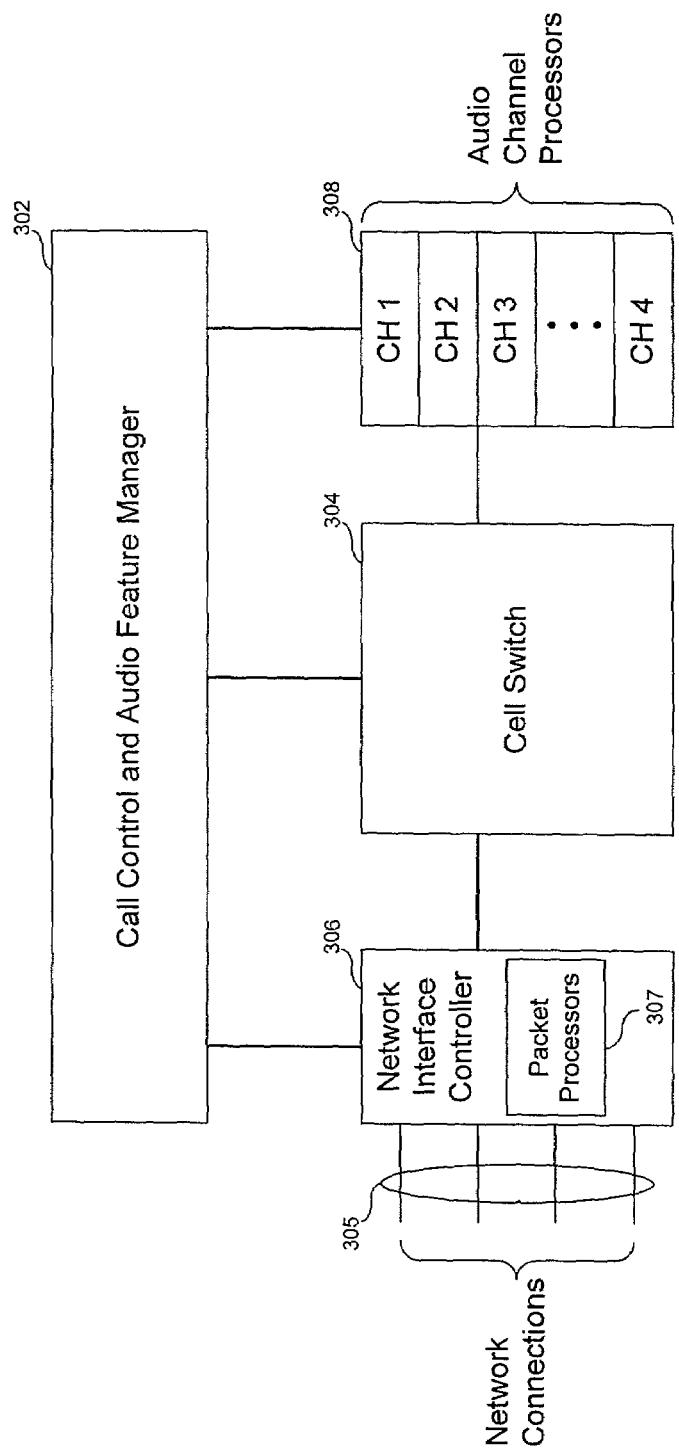
FIGS. 3A and 3B are diagrams of an audio processing platform according to an embodiment of the present invention.

V. Audio Processing Platform with a Packet/Cell Switch for Noiseless Switching of Independent Audio Streams In one embodiment of the present invention, audio processing platform 230 includes a dynamic fully-meshed cell switch 304 and other components for the reception and processing of packets, such as Internet Protocol (IP) packets. Platform 230 is shown in FIG. 3A with regard to audio processing including noiseless switching according to the present invention.

As illustrated, audio processing platform 230 includes a call control and audio feature manager 302, cell switch 304 (also referred to as a packet/cell switch to indicate cell switch 304 can be a cell switch or packet switch), network connections 305, network interface controller 306, and audio channel processors 308. Network interface controller 306 further includes packet processors 307. Call control and audio feature manager 302 is coupled to cell switch 304, network interface controller 306, and audio channels processors 308. In one configuration, call control and audio feature manager 302 is connected directly to the network interface controller 306. Network interface controller 306 then controls packet processor 307 operation based on the control commands sent by call control and audio feature manager 302.

In one embodiment, call control and audio feature manager 302 controls cell switch 304, network interface controller 306 (including packet processors 307), and audio channel processors 308 to provide noiseless switching of independent audio streams according to the present invention. This noiseless switching is described further below with respect to FIGS. 6–9. An embodiment of the call control and audio feature manager 302 according to the present invention is described further below with respect to FIG. 3B.

Network connections 305 are coupled to packet processors 307. Packet processors 307 are also coupled to cell switch 304. Cell switch 304 is coupled in turn to audio channel processors 308. In one embodiment, audio channel processors 308 include four channels capable of handling four calls, i.e., there are four audio processing sections. In alternative embodiments, there are more or less audio channel processors 308.

Data packets, such as IP packets, that include payloads having audio data arrive at network connections 305. In one embodiment, packet processors 307 comprise one or more or eight 100Base-TX full-duplex Ethernet links capable of high speed network traffic in the realm of 300,000 packets per second per link. In another embodiment, packet processors 307 are capable of 1,000 G.711 voice ports per link and/or 8,000 G.711 voice channels per system.

In additional embodiments, packet processors 307 recognize the IP headers of packets and handle all RTP routing decisions with a minimum of packet delay or jitter.

In one embodiment of the present invention, packet/cell switch 304 is a non-blocking switch with 2.5 Gbps of total bandwidth. In another embodiment, the packet/cell switch 304 has 5 Gbps of total bandwidth.

In one embodiment, the audio channel processors 308 comprise any audio source, such as digital signal processors, as described in further detail with regards to FIG. 4. The audio channel processors 308 can perform audio related services including one or more of the services 211a–f.

VI. Example Audio Processing Platform Implementation

Figure 4A:
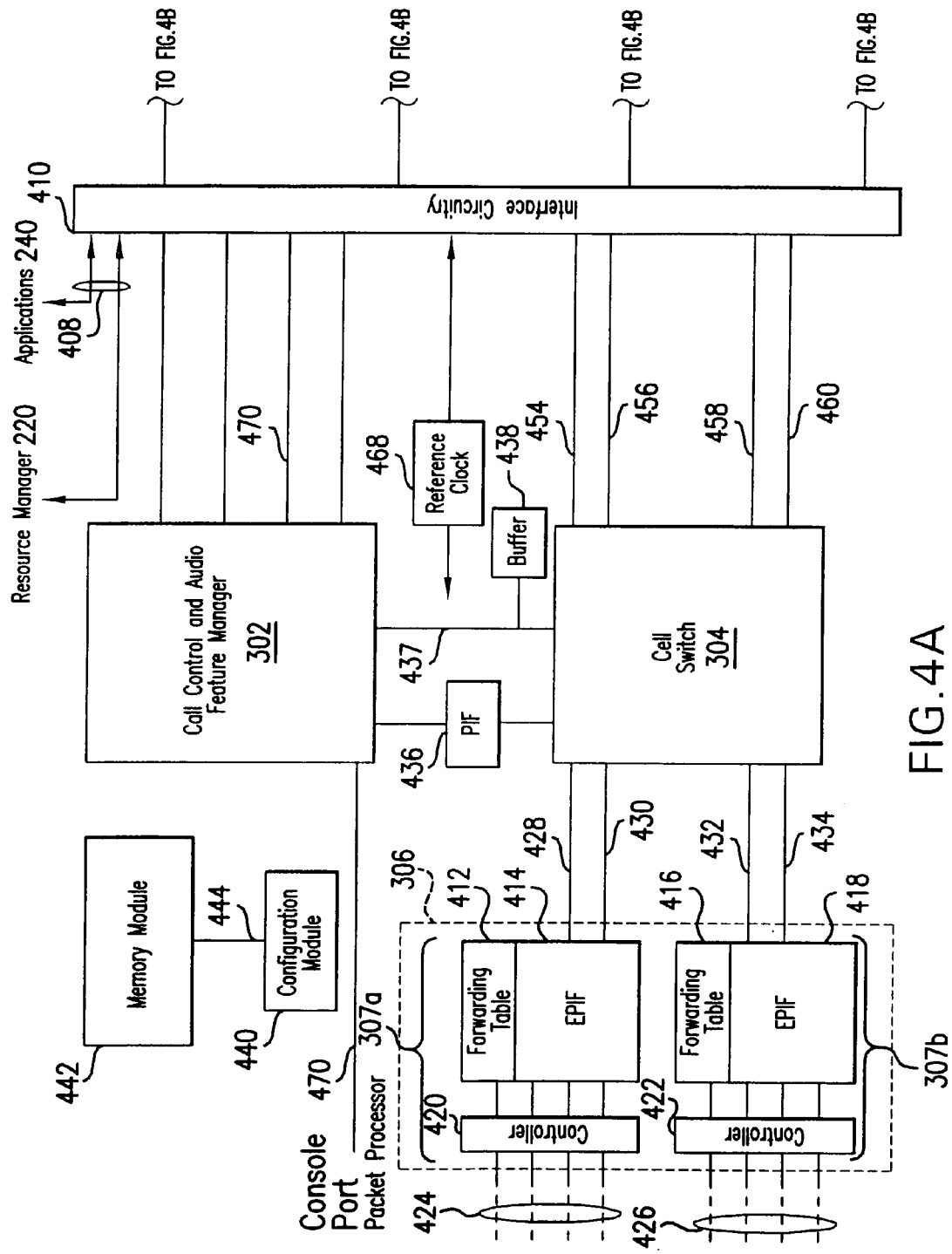
FIGS. 4A and 4B are diagrams of an audio processing platform as shown in FIG. 3 according to an example implementation of the present invention.
Figure 4B:
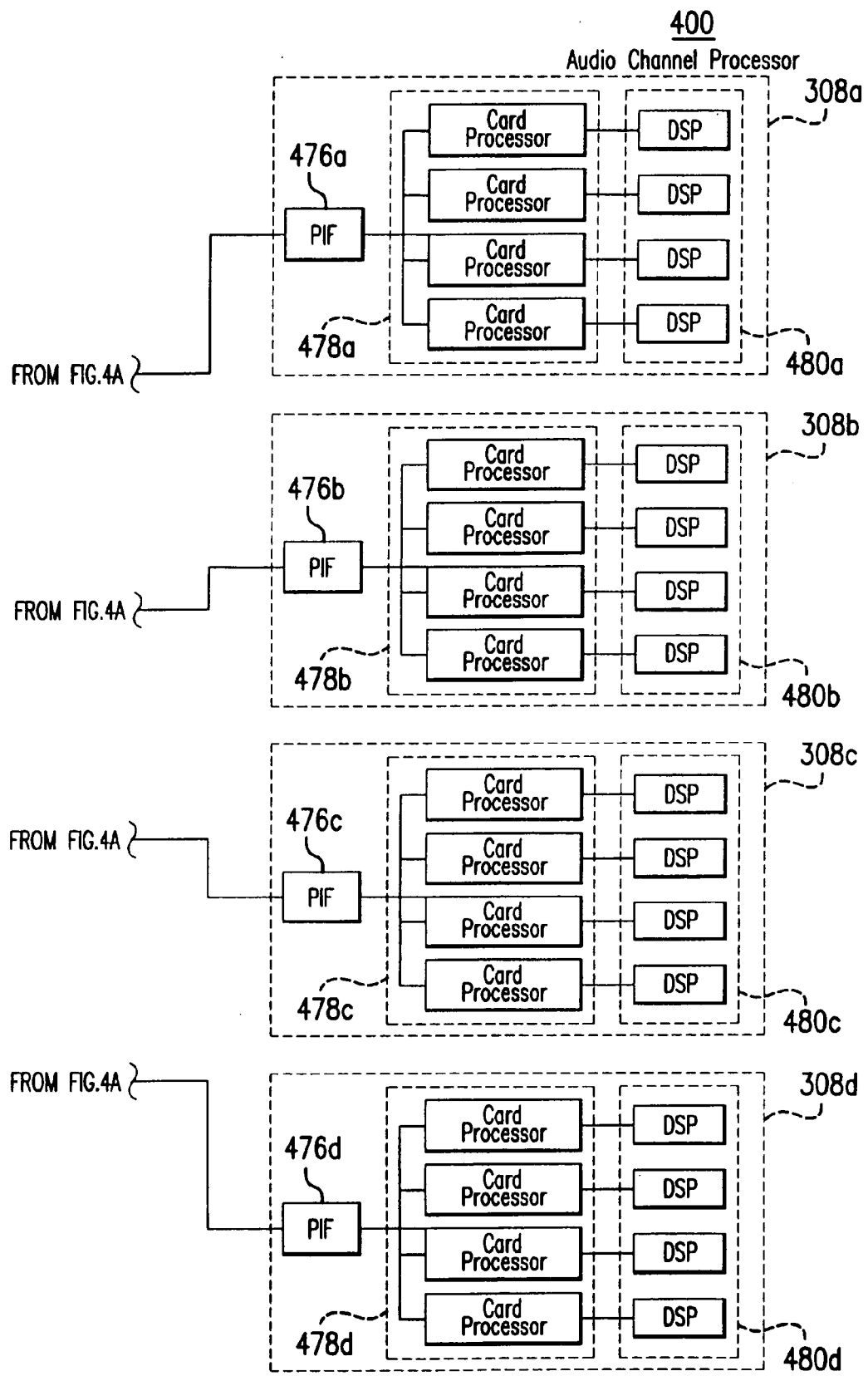

FIGS. 4A and 4B show one example implementation which is illustrative and not intended to limit the present invention. As shown in FIGS. 4A and 4B, audio processing platform 230 can be a shelf controller card (SCC). System 400 embodies one such SCC. System 400 includes cell switch 304, call control and audio feature manager 302, a network interface controller 306, interface circuitry 410, and audio channel processors 308a–d.

More specifically, system 400 receives packets at network connections 424 and 426. Network connections 424 and 426 are coupled to network interface controller 306. Network interface controller 306 includes packet processors 307a–b. Packet processors 307a–b comprise controllers 420, 422, forwarding tables 412, 416, and forwarding processor (EPIF) 414, 418. As shown in FIG. 4A, packet processor 307a is coupled to network connection 424. Network connection 424 is coupled to controller 420. Controller 420 is coupled to both forwarding table 412 and EPIF 414. Packet processor 307b is coupled to network connection 426. Network connection 426 is coupled to controller 422. Controller 422 is coupled to both forwarding table 416 and EPIF 418.

In one embodiment, packet processors 307 can be implemented on one or more LAN daughtercard modules. In another embodiment, each network connection 424 and 426 can be a 100Base-TX or 1000Base-T link.

The IP packets received by the packet processors 307 are processed into internal packets. When a cell layer is used, the internal packets are then converted to cells (such as ATM cells by a conventional segmentation and reassembly (SAR) module). The cells are forwarded by packet processors 307 to cell switch 304. The packet processors 307 are coupled to the cell switch 304 via cell buses 428, 430, 432, 434. Cell switch 304 forwards the cells to interface circuitry 410 via cell buses 454, 456, 458, 460. Cell switch 304 analyzes each of the cells and forwards each of the cells to the proper cell bus of cell buses 454, 456, 458, 460 based on an audio channel for which that cell is destined. Cell switch 304 is a dynamic, fully-meshed switch.

In one embodiment, interface circuitry 410 is a backplane connector.

The resources and services available for the processing and switching of the packets and cells in system 400 are provided by call control and audio feature manager 302. Call control and audio feature manager 302 is coupled to cell switch 304 via a processor interface (PIF) 436, a SAR, and a local bus 437. Local bus 437 is further coupled to a buffer 438. Buffer 438 stores and queues instructions between the call control and audio feature manager 302 and the cell switch 304.

Call control and audio feature manager 302 is also coupled to a memory module 442 and a configuration module 440 via bus connection 444. In one embodiment, configuration module 440 provides control logic for the boot-up, initial diagnostic, and operational parameters of call control and audio feature manager 302. In one embodiment, memory module 442 comprises dual in-line memory modules (DMMs) for random access memory (RAM) operations of call control and audio feature manager 302.

Call control and audio feature manager 302 is further coupled to interface circuitry 410. A network conduit 408 couples resource manager CPU 220 and/or application CPU 240 to the interface circuitry 410. In one embodiment, call control and audio feature manager 302 monitors the status of the interface circuitry 410 and additional components coupled to the interface circuitry 410. In another embodiment, call control and audio feature manager 302 controls the operations of the components coupled to the interface circuitry 410 in order to provide the resources 210 and services 212 of platform 200.

A console port 470 is also coupled to call control and audio feature manager 302. Console port 470 provides direct access to the operations of call control and audio feature manager 302. For example, one could administer the operations, re-boot the media processor, or otherwise affect the performance of call control and audio feature manager 302 and thus the system 400 using the console port 470.

Reference clock 468 is coupled to interface circuitry 410 and other components of the system 400 to provide consistent means of time-stamping the packets, cells and instructions of the system 400.

Interface circuitry 410 is coupled to each of audio channel processors 308a–308d. Each of the processors 308 comprise a PIF 476, a group 478 of one or more card processors (also referred to as "bank" processors), and a group 480 of one or more digital signal processors (DSP) and SDRAM buffers. In one embodiment, there are four card processors in group 478 and 32 DSPs in group 480. In such an embodiment, each card processor of group 478 would access and operate with eight DSPs of group 480.

VII. Call Control and Audio Feature Manager

Figure 3B:
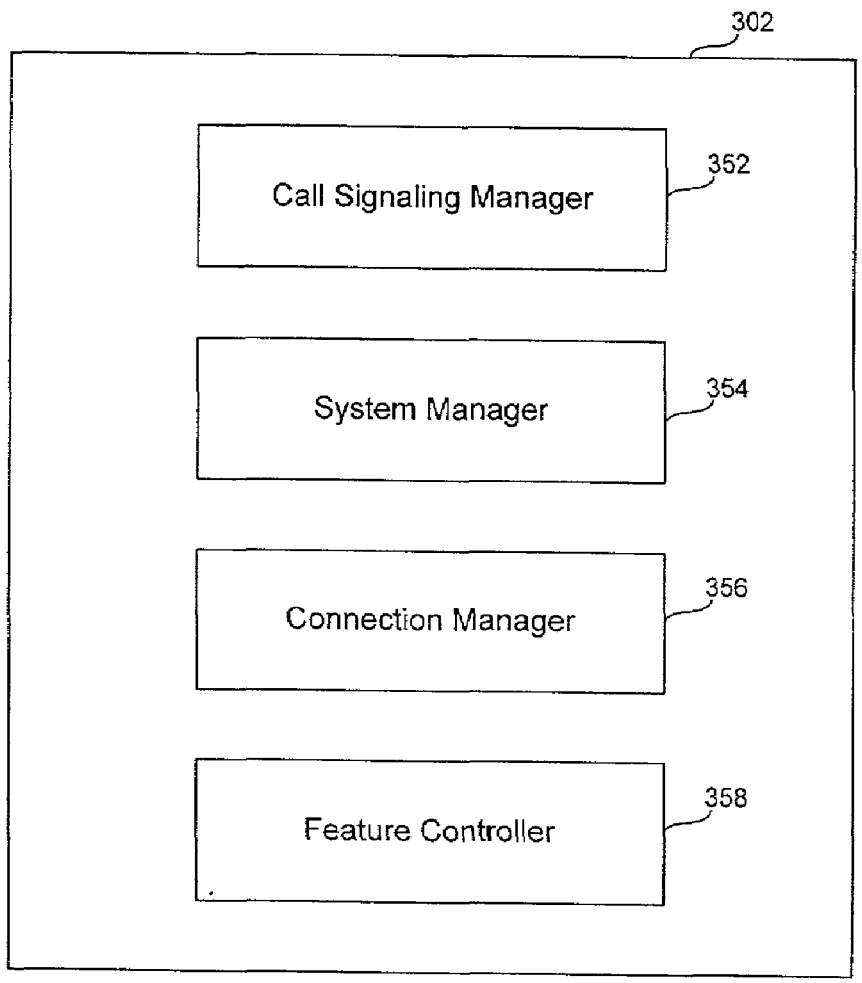

FIG. 3B is a block diagram of call control and audio feature manager 302 according to one embodiment of the present invention. Call control and audio feature manager 302 is illustrated functionally as processor 302. Processor 302 comprises a call signaling manager 352, system manager 354, connection manager 356, and feature controller 358.

Call signaling manager 352 manages call signaling operation such as call establishment and removal, interface with a softswitch, and handling signaling protocols like SIP.

System manager 354 performs bootstrap and diagnostic operations on the components of system 230. System manager 354 further monitors the system 230 and controls various hot-swapping and redundant operation.

Connection manager 356 manages EPIF forwarding tables, such as tables 412 and 416, and provides the routing protocols (such as Routing Information Protocol (RIP), Open Shortest Path First (OSPF), and the like). Further, the connection manager 356 establishes internal ATM permanent virtual circuits (PVC) and/or SVC. In one embodiment, the connection manager 356 establishes bi-directional connections between the network connections, such as network connections 424 and 426, and the DSP channels, such as DSPs 480a–d, so that data flows can be sources or processed by a DSP or other type of channel processor.

In another embodiment, connection manager 356 abstracts the details of the EPIF and ATM hardware. Call signaling manager 352 and the resource manager CPU 220 can access these details so that their operations are based on the proper service set and performance parameters.

Feature controller 358 provides communication interfaces and protocols such as, H.323, and MGCP (Media Gateway Control Protocol).

In one embodiment, card processors 478a–d function as controllers with local managers for the handling of instructions from the call control and audio feature manager 302 and any of its modules: call signaling manager 352, system manager 354, connection manager 356, and feature controller 358. Card processors 478a–d then manage the DSP banks, network interfaces and media streams, such as audio streams.

In one embodiment, the DSPs 480a–d provide the resources 210 and services 212 of platform 200.

In one embodiment, call control and audio feature manager 302 of the present invention exercises control over the EPIF of the present invention through the use of applets. In such an embodiment, the commands for configuring parameters (such as port MAC address, port IP address, and the like), search table management, statistics uploading, and the like, are indirectly issued through applets.

The EPIF provides a search engine to handle the functionality related to creating, deleting and searching entries. Since the platform 200 operates on the source and destination of packets, the EPIF provides search functionality of sources and destinations. The sources and destinations of packets are stored in search tables for incoming (ingress) and outgoing (egress) addresses. The EPIF can also manage RTP header information and evaluating relative priorities of egress audio streams to be transmitted as described in further detail below.

VIII. Audio Processing Platform Operation

Figure 5A:
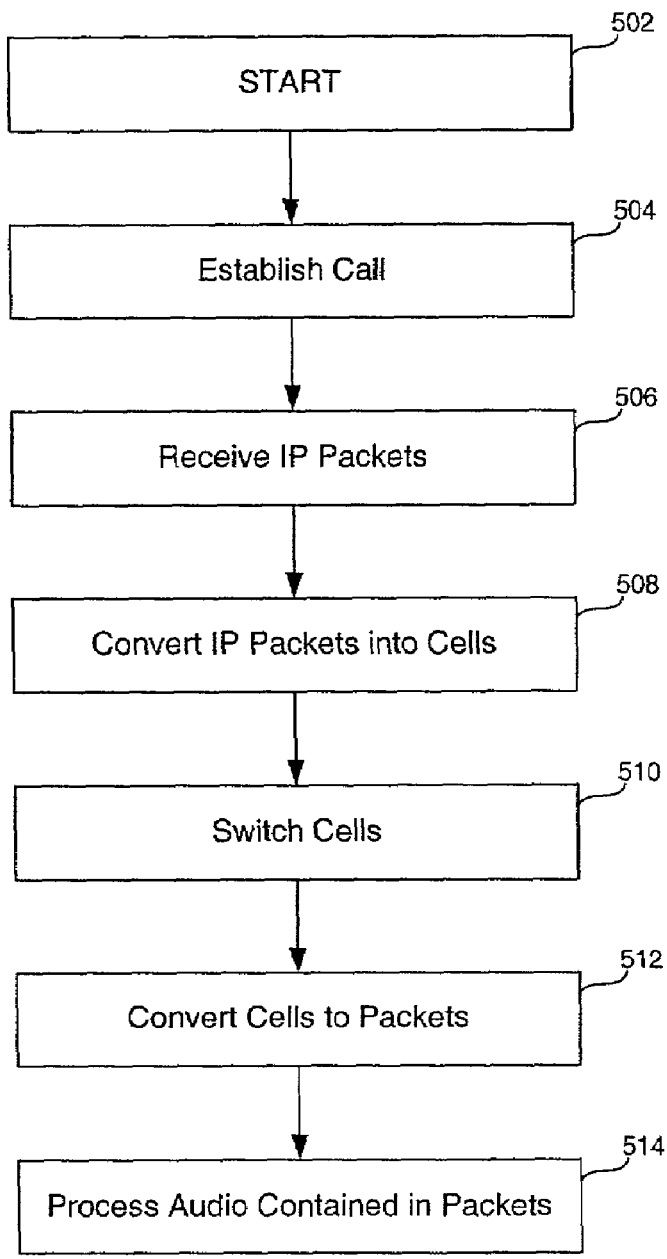
FIG. 5A is a flow diagram showing the establishment of a call and ingress packet processing according to an embodiment of the present invention.
Figure 5B:
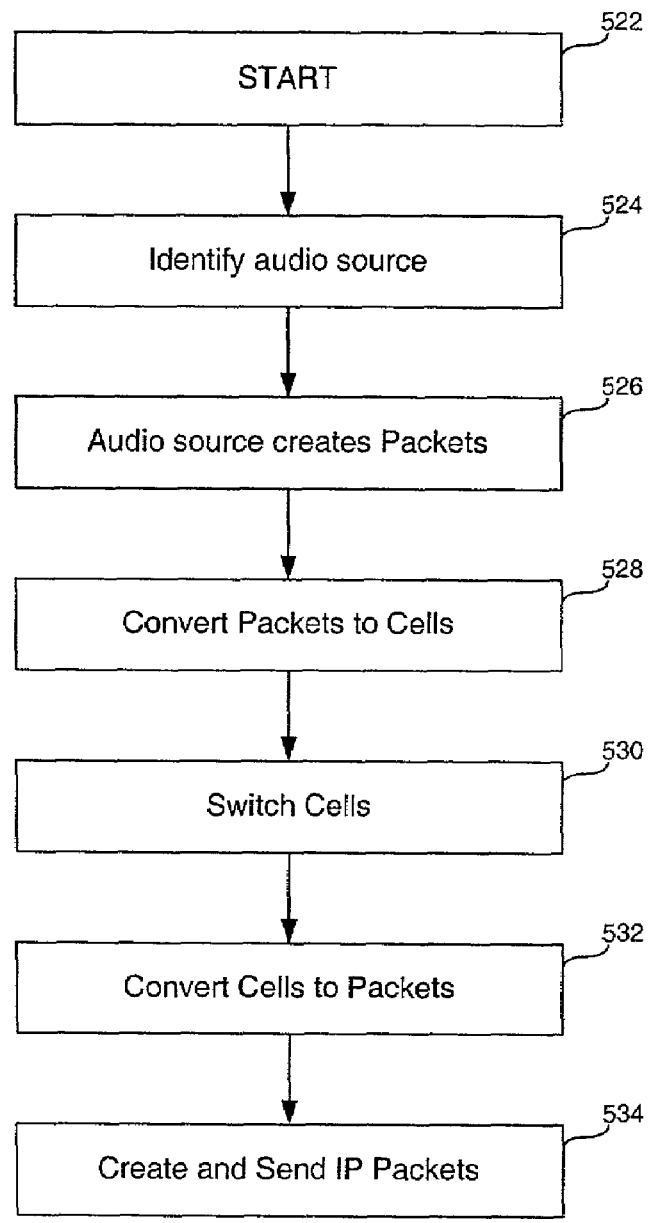
FIG. 5B is a flow diagram showing egress packet processing and call completion according to an embodiment of the present invention.

The operation of audio processing platform 230 is illustrated in the flow diagrams of FIGS. 5A and 5B. FIG. 5A is a flow diagram showing the establishment of a call and ingress packet processing according to an embodiment of the present invention. FIG. 5B is a flow diagram showing egress packet processing and call completion according to an embodiment of the present invention.

A. Ingress Audio Streams

In FIG. 5A, the process for an ingress (also called inbound) audio stream starts at step 502 and immediately proceeds to step 504.

In step 504, call control and audio feature manager 302 establishes a call with a client communicating via the network connections 305. In one embodiment, call control and audio feature manager 302 negotiates and authorizes access to the client. Once client access is authorized, call control and audio feature manager 302 provides IP and UDP address information for the call to the client. Once the call is established, the process immediately proceeds to step 506.

In step 506, packet processors 307 receive IP packets carrying audio via the network connections 305. Any type of packet can be used including but not limited to IP packets, such as Appletalk, IPX, or other type of Ethernet packets. Once a packet is received, the process proceeds to step 508.

In step 508, packet processors 307 check IP and UDP header address in search table to find associated SVC, and then convert the VOIP packets into internal packets. Such internal packets for example can be made up of a payload and control header as described further below with respect to FIG. 7B. Packet processors 307 then construct packets using at least some of the data and routing information and assign a switched virtual circuit (SVC). The SVC is associated with one of the audio channel processors 308, and in particular with one of respective DSP that will process the audio payload.

When a cell layer is used, internal packets are further converted or merged into cells, such as ATM cells. In this way, audio payloads in the internal packets are converted to audio payloads in a stream of one or more ATM cells. A conventional segmentation and reassembly (SAR) module can be used to convert internal packets to ATM cells. Once the packets are converted into the cells, the process proceeds to step 510.

In step 510, cell switch 304 switches the cells to the proper audio channel of the audio channel processors 308 based on the SVC. The process proceeds to step 512.

In step 512, audio channel processors 308 convert the cells into packets. Audio payloads in the arriving ATM cells for each channel are converted to audio payloads in a stream of one or more packets. A conventional SAR module can be used to convert ATM cells to packets. Packets can be internal egress packets or IP packets with audio payloads. Once the cells are converted into the internal packets, the process proceeds to step 514.

In step 514, audio channel processors 308 process the audio data of the packets in the respective audio channels. In one embodiment, the audio channels are related to one or more of the media services 213a–e. For example, these media services can be telebrowsing, voice mail, conference bridging (also called conference calling), video streaming, VOIP gateway services, telephony, or any other media service for audio content.

B. Egress Audio Streams

In FIG. 5B, the process for an egress (also called outbound) audio stream starts at step 522 and immediately proceeds to step 524.

In step 524, call control and audio feature manager 302 identifies an audio source for noiseless switch over. This audio source can be associated with an established call or other media service. Once the audio source is identified, the process immediately proceeds to step 526.

In step 526, an audio source creates packets. In one embodiment, a DSP in audio channel processor 308 is an audio source. Audio data can be stored in a SDRAM associated with the DSP. This audio data is then packetized by a DSP into packets. Any type of packet can be used including but not limited to internal packets or IP packets, such as Ethernet packets. In one preferred embodiment, the packets are internal egress packets generated as described with respect to FIG. 7B.

In step 528, an audio channel processor 308 converts the packets into cells, such as ATM cells. Audio payloads in the packets are converted to audio payloads in a stream of one or more ATM cells. In brief, the packets are parsed and the data and routing information analyzed. Audio channel processor 308 then construct cells using at least some of the data and routing information and assigns a switched virtual circuit (SVC). A conventional SAR module can be used to convert packets to ATM cells. The SVC is associated with one of the audio channel processors 308, and in particular with a circuit connecting the respective DSP of the audio source and a destination port 305 of NIC 306. Once the packets are converted into the cells, the process proceeds to step 530.

In step 530, cell switch 304 switches the cells of an audio channel of the audio channel processors 308 to a destination network connection 305 based on the SVC. The process proceeds to step 532.

In step 532, packet processors 307 convert the cells into IP packets. Audio payloads in the arriving ATM cells for each channel are converted to audio payloads in a stream of one or more internal packets. A conventional SAR module can be used to convert ATM cells to internal packets. Any type of packet can be used including but not limited to IP packets, such as Ethernet packets. Once the cells are converted into the packets, the process proceeds to step 534.

In step 534, each packet processor 307 further adds RTP, IP, and UDP header information. A search table is checked to find IP and UDP header address information associated with the SVC. IP packets are then sent carrying audio via the network connections 305 over a network to a destination device (phone, computer, palm device, PDA, etc.). Packet processors 307 process the audio data of the packets in the respective audio channels. In one embodiment, the audio channels are related to one or more of the media services 213a–e. For example, these media services can be telebrowsing, voice mail, conference bridging (also called conference calling), video streaming, VOIP gateway services, telephony, or any other media service for audio content.

IX. Noiseless Switching of Egress Audio Streams

According to the one aspect of the present invention, audio processing platform 230 noiselessly switches between independent egress audio streams. Audio processing platform 230 is illustrative. The present invention as it relates to noiseless switching of egress audio stream can be used in any media server, router, switch, or audio processor and is not intended to be limited to audio processing platform 230.

A. Cell Switch—Internal Audio Sources

Figure 6A:
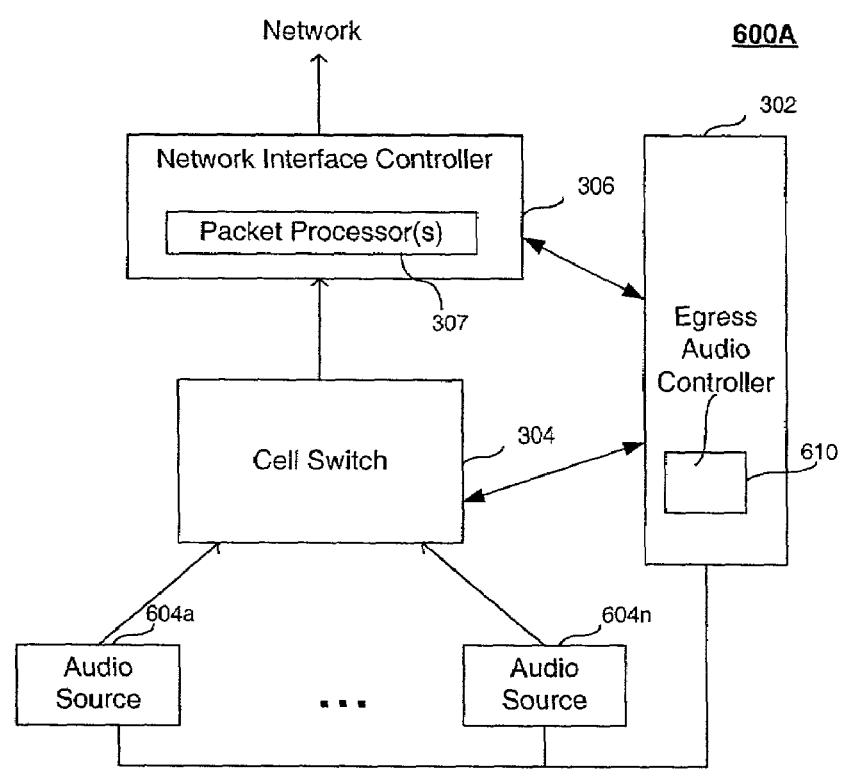
FIGS. 6A–6F are diagrams of noiseless switch over systems according to embodiments of the present invention.

FIG. 6A is diagram of a noiseless switch over system that carries out cell switching of independent egress audio streams generated by internal audio sources according to an embodiment of the present invention. FIG. 6A shows an embodiment of a system 600A for egress audio stream switching from internal audio sources. System 600A includes components of audio processing platform 230 configured for an egress audio stream switching mode of operation. In particular, as shown in FIG. 6A, system 600A includes call control and audio feature controller 302 coupled to a number n of internal audio sources 604n, cell switch 304, and network interface controller 306. Internal audio sources 604a–604n can be two or more audio sources. Any type of audio source can be used including but not limited to DSPs. In one example, DSPs 480 can be audio sources. To generate audio, audio sources 604 can either create audio internally and/or convert audio received from external sources.

Call control and audio feature controller 302 further includes an egress audio controller 610. Egress audio controller 610 is control logic that issues control signals to audio sources 604n, cell switch 304, and/or network interface controller 306 to carry out noiseless switching between independent egress audio streams according to the present invention. The control logic can implemented in software, firmware, microcode, hardware or any combination thereof.

A cell layer including SARs 630, 632, 634 is also provided. SARs 630, 632 are coupled between cell switch 304 and each audio source 604a–n. SAR 634 is coupled between cell switch 304 and NIC 306.

Figure 7A:
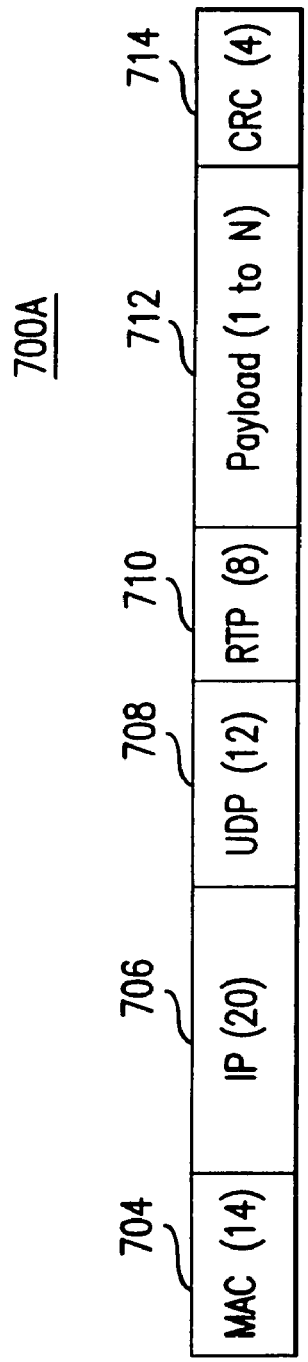
FIG. 7A is a schematic illustration of an IP packet with RTP information.
Figure 7B:
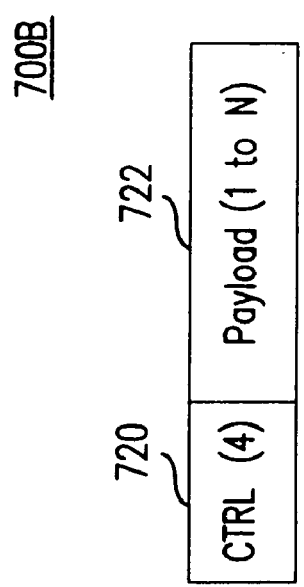
FIG. 7B is a schematic illustration of an internal packet according to one embodiment of the present invention.
Figure 8:
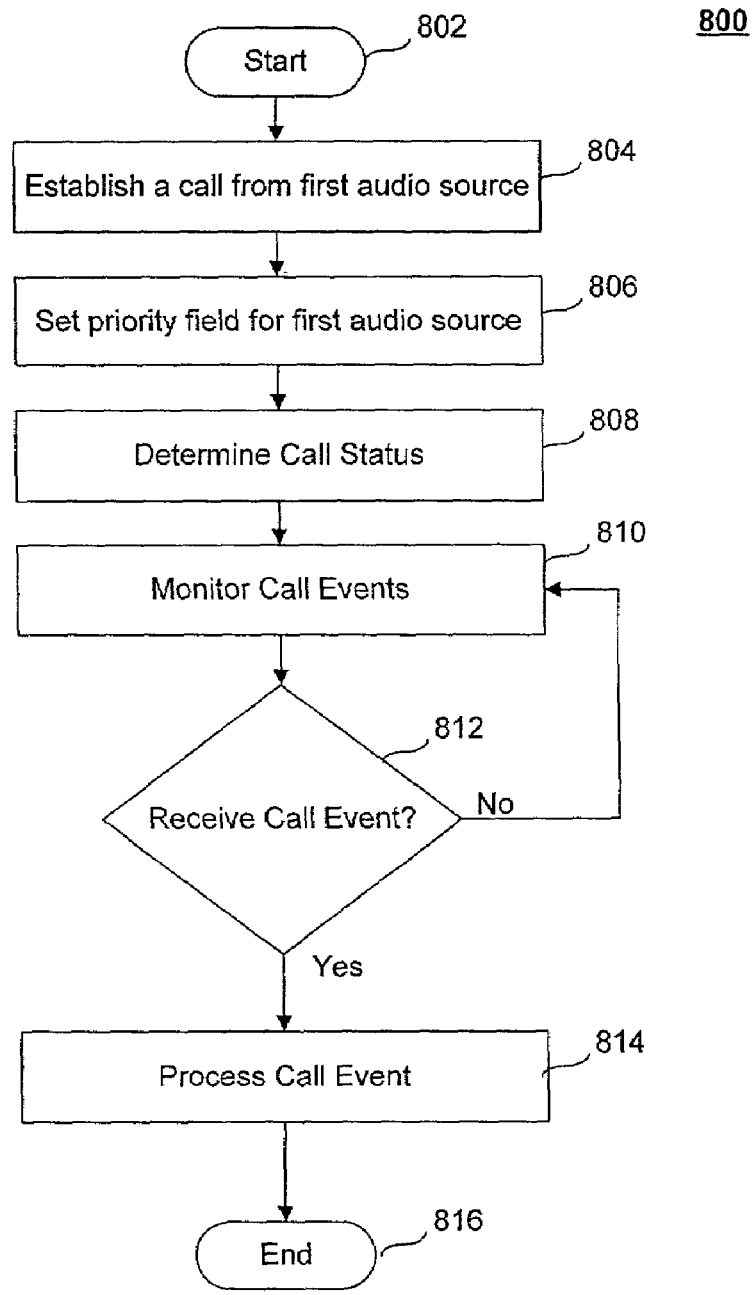
FIG. 8 is a flow diagram showing the switching functionality according to one embodiment of the present invention.

In one embodiment, independent egress audio streams involve streams of IP packets with RTP information and internal egress packets. Accordingly, it is helpful to first describe IP packets and internal egress packets (FIGS. 7A–7B). Next, system 600A and its operation is described in detail with respect to independent egress audio streams (FIGS. 8–9).

B. Packets

In one embodiment, the present invention uses two types of packets: (1) IP packets with RTP information and (2) internal egress packets. Both of these types of packets are shown and described with respect to examples in FIGS. 7A and 7B. IP packets 700A are sent and received over a external packet-switched network by packet processors 307 in NIC 306. Internal egress packets 700B are generated by audio sources (e.g. DSPs) 604a–604n.

1. IP Packets with RTP Information

A standard Internet Protocol (IP) packet 700A is shown in FIG. 7A. IP packet 700A is shown with various components: media access control (MAC) field 704, IP field 706, user datagram protocol (UDP) field 708, RTP field 710, payload 712 containing digital data, and cyclic redundancy check (CRC) field 714. Real-Time Transport Protocol (RTP) is a standardized protocol for carrying periodic data, such as digitized audio, from a source device to a destination device. A companion protocol, Real-Time Control Protocol (RTCP), can also be used with RTP to provide information on the quality of a session.

More specifically, the MAC 704 and IP 706 fields contain addressing information to allow each packet to traverse an IP network interconnecting two devices (origin and destination). UDP field 708 contains a 2-byte port number that identifies a RTP/audio stream channel number so that it can be internally routed to the audio processor destination when received from the network interface. In one embodiment of the present invention, the audio processor is a DSP, as described herein.

RTP field 710 contains a packet sequence number and timestamp. Payload 712 contains the digitized audio byte samples and can be decoded by the endpoint audio processors. Any payload type and encoding scheme for audio and/or video types of media compatible with RTP can be used as would be apparent to a person skilled in the art given this description. CRC field 714 provides a way to verify the integrity of the entire packet. See, the description of RTP packets and payload types described by D. Collins, *Carrier Grade Voice over IP*, pp. 52–72 (the text of the entire book of which is incorporated herein by reference).

2. Internal Egress Packets

FIG. 7B illustrates an example internal egress packet of the present invention in greater detail. Packet 700B includes a control (CRTL) header 720 and a payload 722. The advantage of internal egress packet 700B is it is simpler to create and smaller in size than IP packet 700A. This reduces the burden and work required of audio sources and other components handling the internal egress packets.

In one embodiment, audio sources 604a–604n are DSPs. Each DSP adds a CRTL header 720 in front of a payload 722 that it creates in for a respective audio stream. CRTL 720 is then used to relay control information downstream. This control information for example can be priority information associated with a particular egress audio stream.

Packet 700B is converted to one or more cells, such as ATM cells, and sent internally over cell switch 304 to a packet processor 307 in network interface controller 306.

After the cells are converted to internal egress packets, packet processor 307 decodes and removes internal header CRTL 720. The rest of the IP packet information is added before the payload 722 is transmitted as an IP packet 700A onto an IP network. This achieves an advantage as processing work at the DSPs is reduced. DSPs only have to add a relatively short control header to payloads. The remaining processing work of adding information to create valid IP packets with RTP header information can be distributed to packet processor(s) 307.

C. Priority Levels

Network interface controller (NIC) 306 processes all internal egress packets, as well as all egress IP packets destined for the external network. Thus, NIC 306 can make final forwarding decisions about each packet sent to it based on the content of each packet. In some embodiments, NIC 306 manages the forwarding of egress IP packets based on priority information. This can include switching over to an audio stream of egress IP packets with a higher priority and buffering or not forwarding another audio stream of egress IP packets with a lower priority.

In one embodiment, internal audio sources 604a–604n determine priority levels. Alternatively, NIC 306 can determine a priority for audio received from an external source at NIC 306. Any number of priority levels can be used. The priority levels distinguish the relative priority of audio sources and their respective audio streams. Priority levels can be based on any criteria selected by a user including, but not limited to, time of day, identity or group of the caller or callee, or other similar factors relevant to audio processing and media services. Components of the system 600 filter and forward the priority level information within the audio stream. In one embodiment, a resource manager in system 600 can interact with external systems to alter the priority levels of audio streams. For example, an external system can be an operator informing the system to queue a billing notice or advertisement on a call. Thus, the resource manager is capable of barging into audio streams. This noiseless switch over can be triggered by user or automatically based on certain predefined events such as signaling conditions like on-hold condition, emergency event, or timed event.

D. Noiseless Fully Meshed Cell Switch

System 600A can be thought of as a "free pool" of multiple input (ingress) and output (egress) audio channels because a fully meshed packet/cell switch 304 is used to switch egress audio channels to participate in any given call. Any egress audio channel can be called upon to participate in a telephone call at any time. During both the initial call setup and while the call is in session, any egress audio channel can be switched into and out of the call. The fully meshed switching capability of system 600A of the present invention provides a precise noiseless switching functionality which does not drop or corrupt the IP packets or the cells of the present invention. In addition, a two-stage egress switching technique is used.

E. Two-Stage Egress Switching

System 600A includes at least two stages of switching. In terms of egress switching, the first stage is cell switch 304. The first stage is cell-based and uses switched virtual circuits (SVCs) to switch audio streams from separate physical sources (audio sources 604a–604n) to a single destination egress network interface controller (NIC 306). Priority information is provided in the CTRL header 720 of cells generated by the audio sources. The second stage is contained within the egress NIC 306 such that it selects which of the audio streams from multiple audio sources (604a–604n) to process and send over a packet network such as an packet-switched IP network. This selection of which audio streams to forward can be performed by NIC 306 is based on the priority information provided in the CTRL headers 720. In this way, a second audio stream with a higher priority can be forwarded by NIC 306 on the same channel as a first audio stream. From the perspective of the destination device receiving the audio streams, the insertion of the second audio stream on the channel is received as a noiseless switch between independent audio streams.

More specifically, in one embodiment, the egress audio switching can occur in a telephone call. A call is first established using audio source 604a by negotiating with the destination device's MAC, IP, and UDP information, as previously described. First audio source 604a begins generating a first audio stream during the call. The first audio stream is made up of internal egress packets having audio payload and CRTL header 720 information as described with respect to packet format 700B. Internal egress packets egress on the channel established for the call. Any type of audio payload including voice, music, tones, or other audio data can be used. SAR 630 converts the internal packets to cells for transport through cell switch 304 to SAR 634. SAR 634 then converts cells back to internal egress packets prior to delivery to NIC 306.

During the flow from the audio source 604a, NIC 306 is decoding and removing the CTRL header 720 and adding the appropriate RTP, UDP, IP, MAC, and CRC fields, as previously described. CTRL header 720 includes the priority field used by NIC 306 to process the packet and send a corresponding RTP packet. NIC 306 evaluates the priority field. Given the relatively high priority field (the first audio source 604a is the only transmitting source), NIC 306 forwards IP packets with synchronized RTP header information which carry the first audio stream over the network to the destination device associated with the call. (Note CTRL header 720 can also include RTP or other synchronized header information which can be used or ignored by NIC 306 if NIC 306 generates and adds RTP header information).

When the egress audio controller 610 determines a call event where a noiseless switch over is to occur, a second audio source 604n begins generating a second audio stream. Audio can be generated by audio source 604n directly or by converting audio originally generated by external devices. The second audio stream is made up of internal egress packets having audio payload and CRTL header 720 information as described with respect to packet format 700B. Any type of audio payload including voice, music, or other audio data can be used. Assume the second audio stream is given a higher priority field than the first audio stream. For example, the second audio stream can represent an advertisement, emergency public service message, or other audio data that is desired to have noiselessly inserted into the first channel established with the destination device.

The second audio stream's internal egress packets are then converted to cells by SAR 632. Cell switch 304 switches the cells to an SVC destined for the same destination NIC 306 as the first audio stream. SAR 634 converts the cells back to internal packets. NIC 306 now receives the internal packets for the first and second audio streams. NIC 306 evaluates the priority field in each stream. The second audio stream having internal packets with the higher priority are converted to IP packets with synchronized RTP header information and forwarded to the destination device. The first audio stream having internal packets with the lower priority are either stored in a buffer or converted to IP packets with synchronized RTP header information and stored in buffer. NIC 306 can resume forwarding the first audio stream when the second audio stream is completed, after a predetermined time elapses, or when a manual or automatic control signal is received to resume.

F. Call Event Triggering Noiseless Switch Over

Figure 9A:
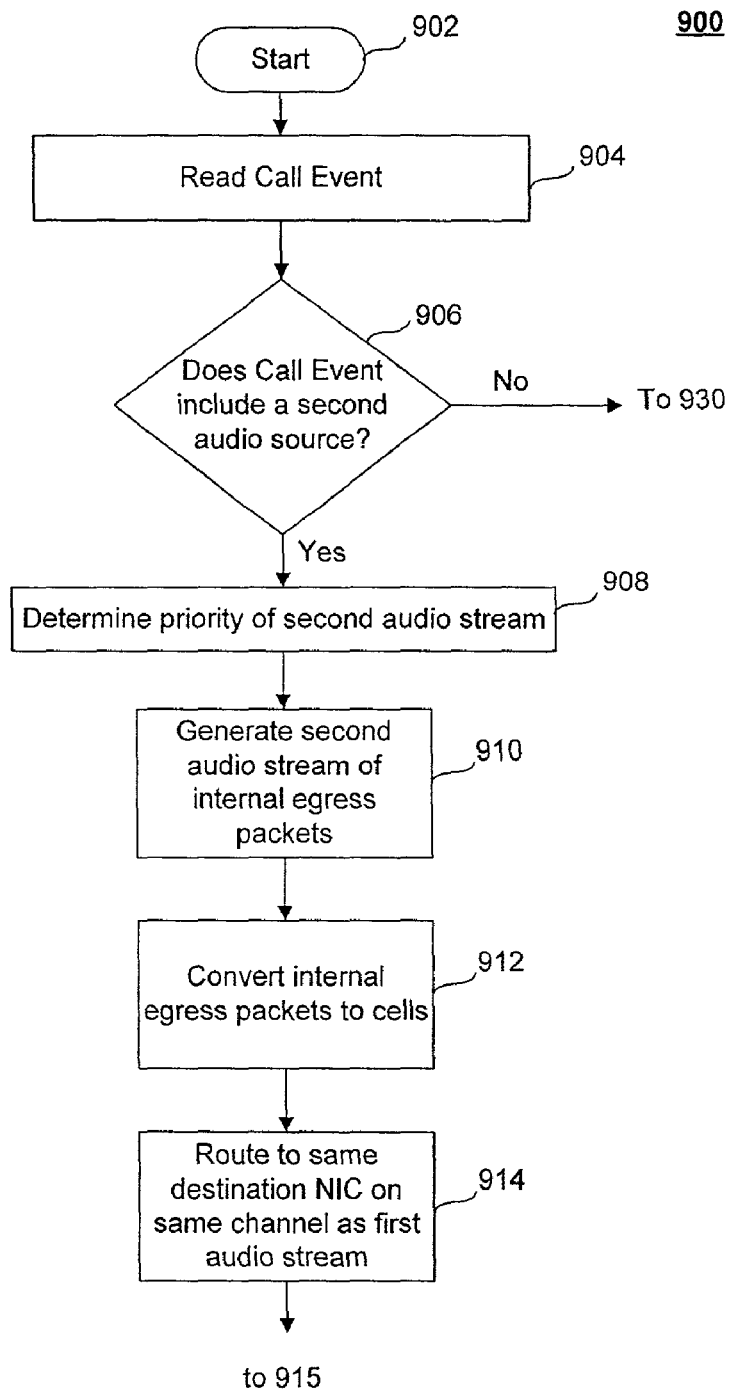
FIGS. 9A, 9B, and 9C are flow diagrams showing the call event processing for audio stream switching according to one embodiment of the present invention.
Figure 9B:
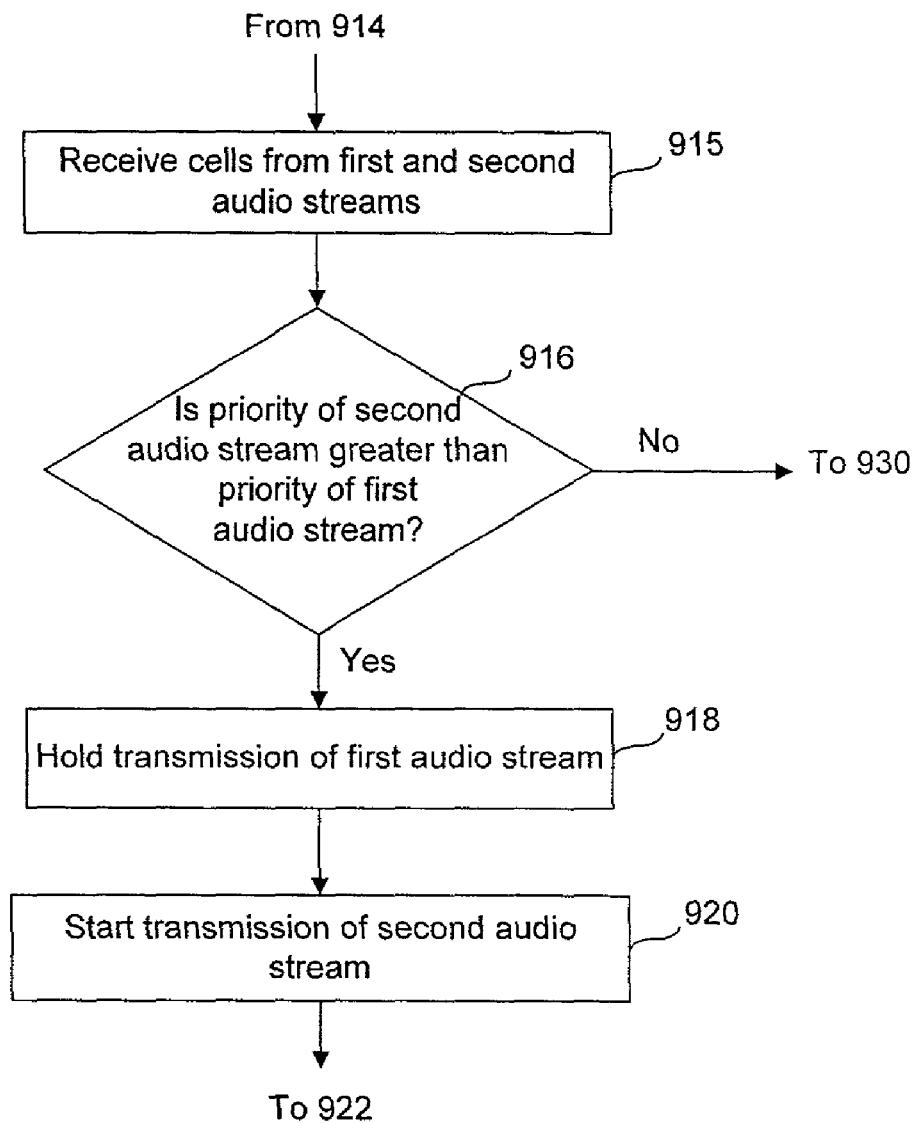

The functionality of the priority field in an embodiment of noiseless switching according to the present invention is now described with regard to FIGS. 8, 9A and 9B.

In FIG. 8, a flow diagram of a noiseless switching routine 800 according to one embodiment of the present invention is shown. For brevity, the noiseless switching routine 800 is described with respect system 600.

Flow 800 begins at step 802 and proceeds immediately to step 804.

In step 804, call control and audio feature manager 302 establishes a call from a first audio source 604a to a destination device. Call control and audio feature manager 302 negotiates with the destination device to determine the MAC, IP and UDP port to use in a first audio stream of IP packets sent over a network.

Audio source 604a delivers a first audio stream on one channel for the established call. In one embodiment, a DSP delivers the first audio stream of internal egress packets on one channel to cell switch 304 and then to NIC 306. The process proceeds to step 806.

In step 806, egress audio controller 610 sets a priority field for the first audio source. In one embodiment, egress audio controller 610 sets the priority field to a value of one. In another embodiment, the priority field is stored in the CRTL header of the internally routed internal egress packets. The process immediately proceeds to step 808.

In step 808, egress audio controller 610 determines the call's status. In one embodiment, egress audio controller 610 determines whether or not the call allows or has been configured to allow call events to interact with it. In one embodiment of the present invention, a call can be configured so that only emergency call events will interrupt it. In another embodiment, a call can be configured to receive certain call events based on either the caller(s) or callee(s) (i.e., the one or more of the parties on the call). The process immediately proceeds to step 810.

In step 810, egress audio controller 610 monitors for call events. In one embodiment, a call event can be generated within the system 600, such as notifications of time, weather, advertisements, billing ("please insert another coin" or "you have 5 minutes remaining"). In another embodiment, call events can be sent to the system 600, such as requests for news, sporting information, etc. Egress audio controller 610 can monitor both internally and externally for call events. The process proceeds immediately to step 812.

In step 812, egress audio controller 610 receives a call event. If not, then egress audio controller 610 continues to monitor as stated in step 810. If so, then the process proceeds immediately to step 814.

In step 814, egress audio controller 610 determines the call event and performs the operations necessitated by the call event. The process then proceeds to step 816 where it either ends or returns to step 802. In one embodiment, the process 800 repeats for as long as the call continues.

Figure 9C:
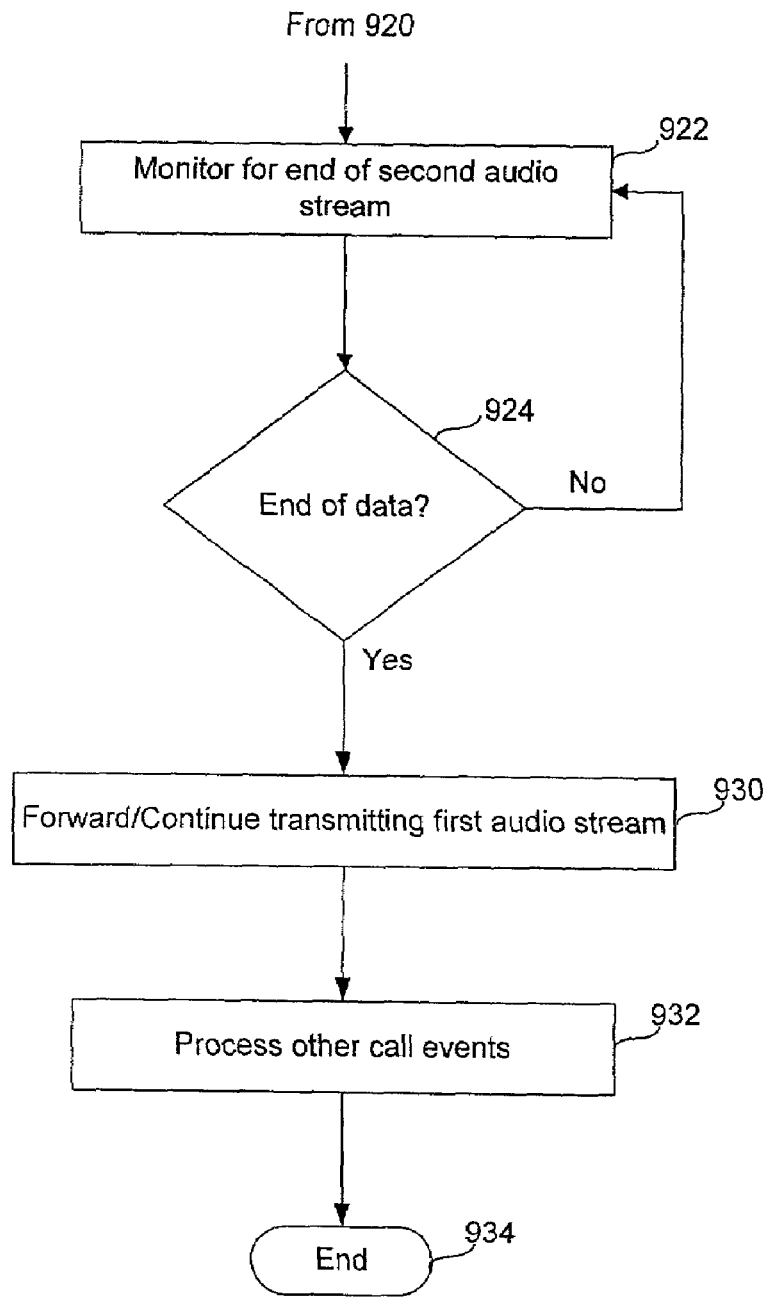

In FIGS. 9A–9C, flow diagram 900 of the call event processing for audio stream switching based on priority according to one embodiment of the present invention are shown. In one embodiment, flow 900 shows in more detail the operations performed in step 814 of FIG. 8.

Process 900 starts at step 902 and proceeds immediately to step 904.

In step 904, egress audio controller 610 reads a call event for an established call. In this operation, a first audio stream from source 604a is already being sent from NIC 306 to a destination device as part of the established call. The process proceeds to step 906.

In step 906, egress audio controller 610 determines whether the call event includes a second audio source. If so, then the process proceeds to step 908. If not, then the process proceeds to step 930.

In step 908, egress audio controller 610 determines the priority of the second audio source. In one embodiment, egress audio controller 610 issues a command to second audio source 604n that instructs the second audio source to generate a second audio stream of internal egress packets. Priority information for the second audio stream can be automatically generated by the second audio source 604n or generated based on a command from the egress audio controller 610. The process then proceeds to step 910.

In step 910, a second audio source 604n begins generating a second audio stream. The second audio stream is made up of internal egress packets having audio payload and CRTL header 720 information as described with respect to packet format 700B. Any type of audio payload including voice, music, or other audio data can be used. The process then proceeds to step 912.

In step 912, the second audio stream's egress packets are then converted to cells. In one example, the cells are ATM cells. The process then proceeds to step 914.

In step 914, cell switch 304 switches the cells to an SVC destined for the same destination NIC 306 on the same egress channel as the first audio stream. The process then proceeds to step 915.

As shown in step 915 of FIG. 9B, SAR 634 now receives cells for the first and second audio streams. The cells are converted back to streams of internal egress packets and have control headers that include the respective priority information for the two audio streams.

In step 916, NIC 306 compares the priorities of the two audio streams. If the second audio stream has a higher priority then the process proceeds to step 918. If not, then the process proceeds to step 930.

In step 918, the transmission of the first audio stream is held. For example, NIC 306 buffers the first audio stream or even issues a control command to audio source 604a to hold the transmission of the first audio source. The process proceeds immediately to step 920.

In step 920, the transmission of the second audio stream starts. NIC 306 instructs packet processor(s) 307 to create IP packets having the audio payload of the internal egress packets of the second audio stream. Packet processor(s) 307 add additional synchronized RTP header information (RTP packet information) and other header information (MAC, IP, UDP fields) to the audio payload of the internal egress packets of the second audio stream.

NIC 306 then sends the IP packets with synchronized RTP header information on the same egress channel of the first audio stream. In this way, a destination device receives the second audio stream noise instead of the first audio stream. Moreover, from the perspective of the destination device this second audio stream is received in real-time noiselessly without delay or interruption. Steps 918 and 920 of course can be performed at the same time or in any order. The process proceeds immediately to step 922.

As shown in FIG. 9C, NIC 306 monitors for the end of the second audio stream (step 922). The process proceeds immediately to step 924.

In step 924, NIC 306 determines whether the second audio stream has ended. In one example, NIC 306 reads a last packet of the second audio stream which has a priority level lower than preceeding packets. If so, then the process proceeds immediately to step 930. If not, then the process proceeds to step 922.

In step 930, NIC 306 either continues to forward the first audio stream (after step 906) or returns to forwarding the first audio stream (after steps 916 or 924). The process proceeds to step 932.

In one embodiment, NIC 306 maintains a priority level threshold value. NIC 306 then increments and sets the threshold based on priority information in the audio streams. When faced with multiple audio streams, NIC 306 forwards the audio stream having priority information equal to or greater than the priority level threshold value. For example, if the first audio stream had a priority value of 1 then the priority level threshold value is set to 1 and the first audio stream is transmitted (prior to step 904). When a second audio stream with a higher priority is received at NIC 306, then NIC 306 increments the priority threshold value to 2. The second audio stream is then transmitted as described above in step 920. When the last packet of the second audio stream having a priority field value set to 0 (or null or other special value) is read, then the priority level threshold value is decremented back to 1 as part of step 924. In this case, the first audio stream with priority information 1 is then be sent by NIC 306 as described above with respect to step 930.

In step 932, egress audio controller 610 processes any remaining call events. The process then proceeds to step 934 where it terminates until re-instantiated. In one embodiment, the steps of the above-described process occur substantially at the same time, such that the process can be run in parallel or in an overlapping manner on one or more processors in the system 600.

G. Audio Data Flow

Figure 6B:
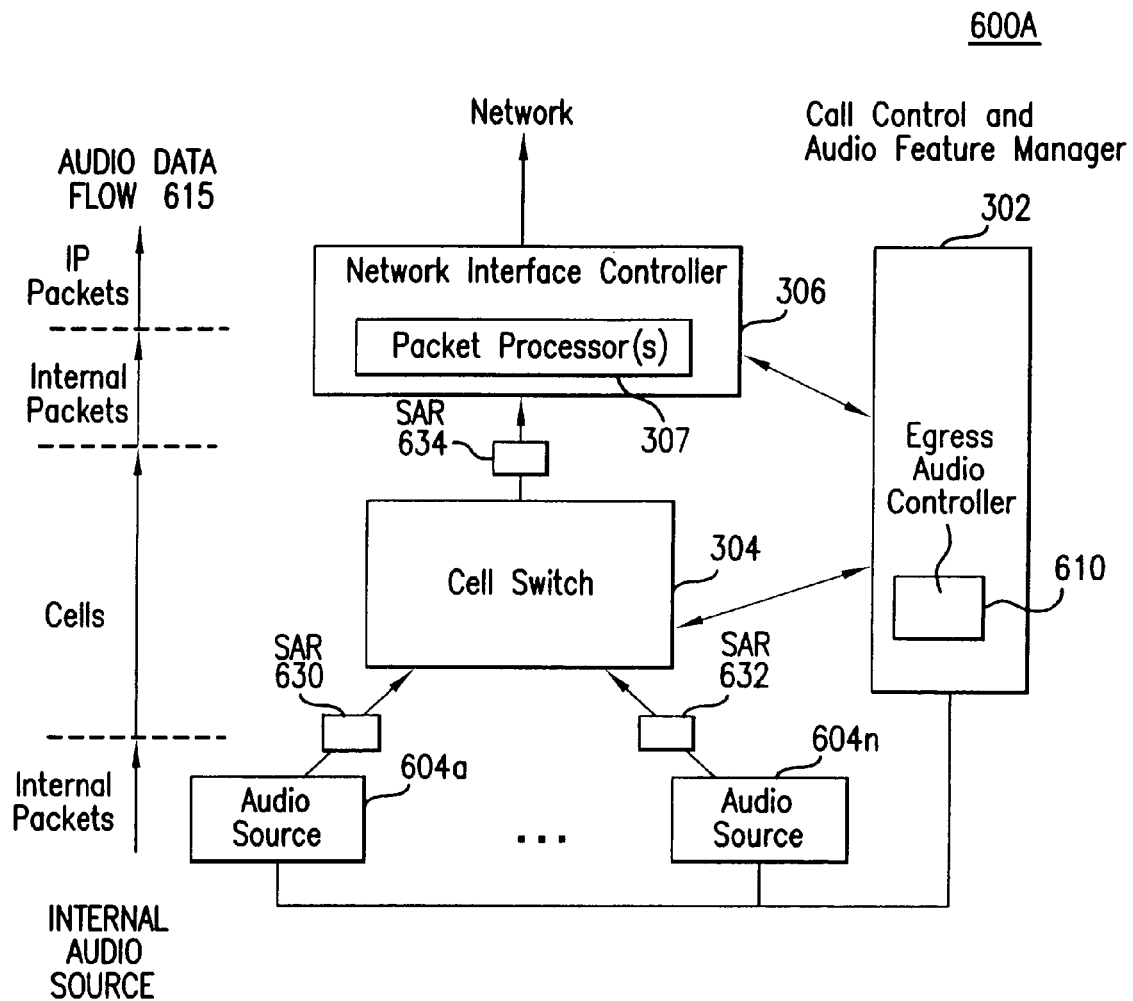

FIG. 6B is a diagram of audio data flow 615 in the noiseless switch over system of FIG. 6A in one embodiment. In particular, FIG. 6B shows the flow of internal packets from audio sources 604a–n to SARs 630, 632, the flow of cells through cell switch 304 to SAR 634, the flow of internal packets between SAR 634 and packet processors 307, and the flow of IP packets from NIC 306 over the network.

H. Other Embodiments

Figure 6C:
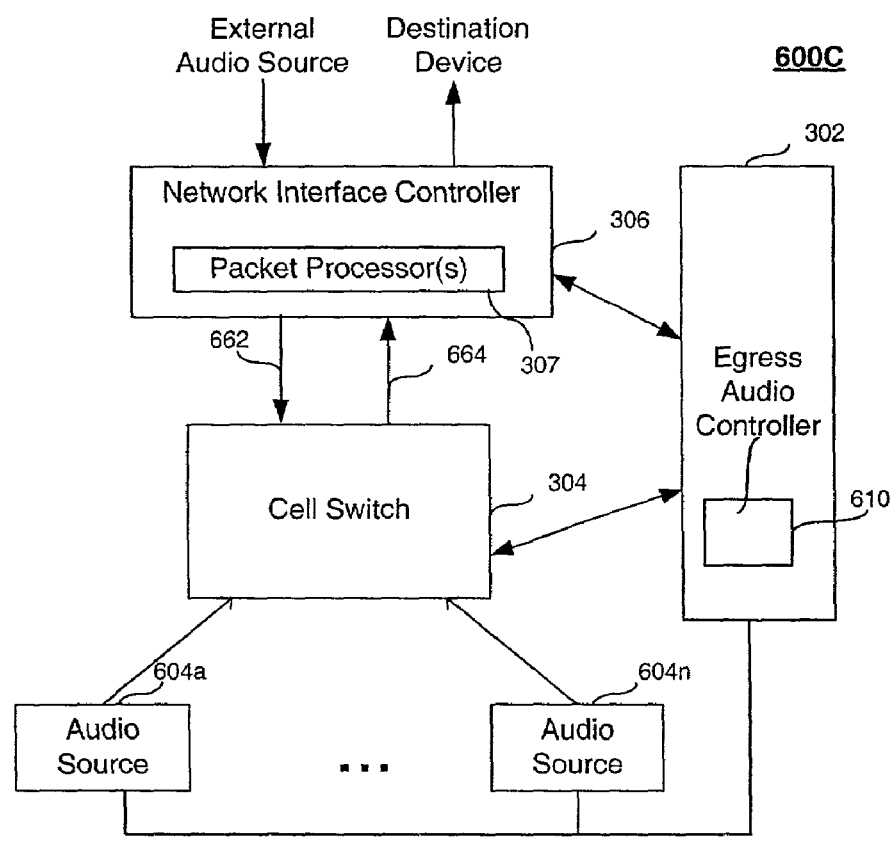
Figure 6D:
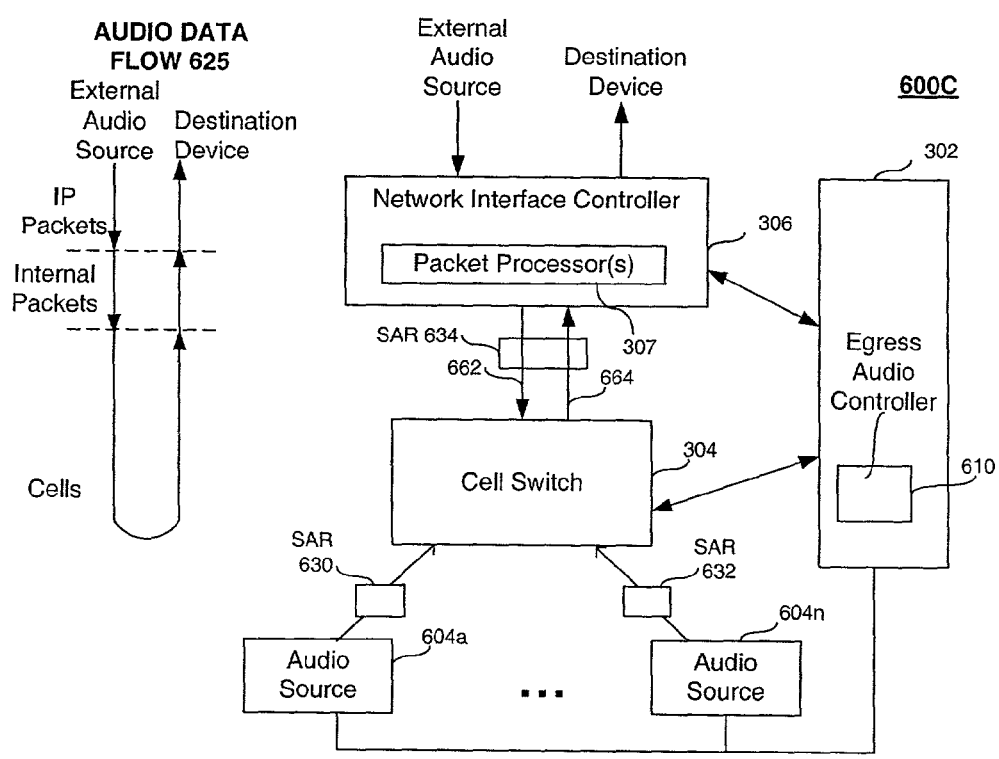

The present invention is not limited to internal audio sources or a cell layer. Noiseless switch over can also be carried out in different embodiments using internal audio sources only, internal and external audio sources, external audio sources only, a cell switch or a packet switch. For example, FIG. 6C is diagram of a noiseless switch over system 600C that carries out cell switching between independent egress audio streams generated by internal audio source 604a–n and/or external audio sources (not shown) according to an embodiment of the present invention. Noiseless switch over system 600C operates similar to system 600A described in detail above except that noiseless switch over is made to audio received from an external audio source. The audio is received in IP packets and buffered at NIC 306 as shown in FIG. 6C. NIC 306 strips IP information (stores it in forward table entry associated with external audio source and destination device) and generates internal packets assigned to a SVC. SAR 634 converts the internal packets to cells and routes cells on the SVC on link 662 through switch 304 back through link 664 to SAR 634 for conversion to internal packets. As described above, the internal packets are then processed by packet processor 307 to create IP packets with synchronized header information. NIC 306 then sends the IP packets to destination device. In this way, a user at the destination device is noiselessly switched over to receive audio from an external audio source. FIG. 6D is diagram of audio data flow 625 for an egress audio stream received from the external audio source in the noiseless switch over system of FIG. 6C. In particular, FIG. 6D shows the flow of IP packets from an external audio source (not shown) to NIC 306, the flow of internal packets from NIC 306 to SAR 634, the flow of cells through cell switch 304 back to SAR 634, the flow of internal packets between SAR 634 and packet processors 307, and the flow of IP packets from NIC 306 over the network to a destination device (not shown).

Figure 6E:
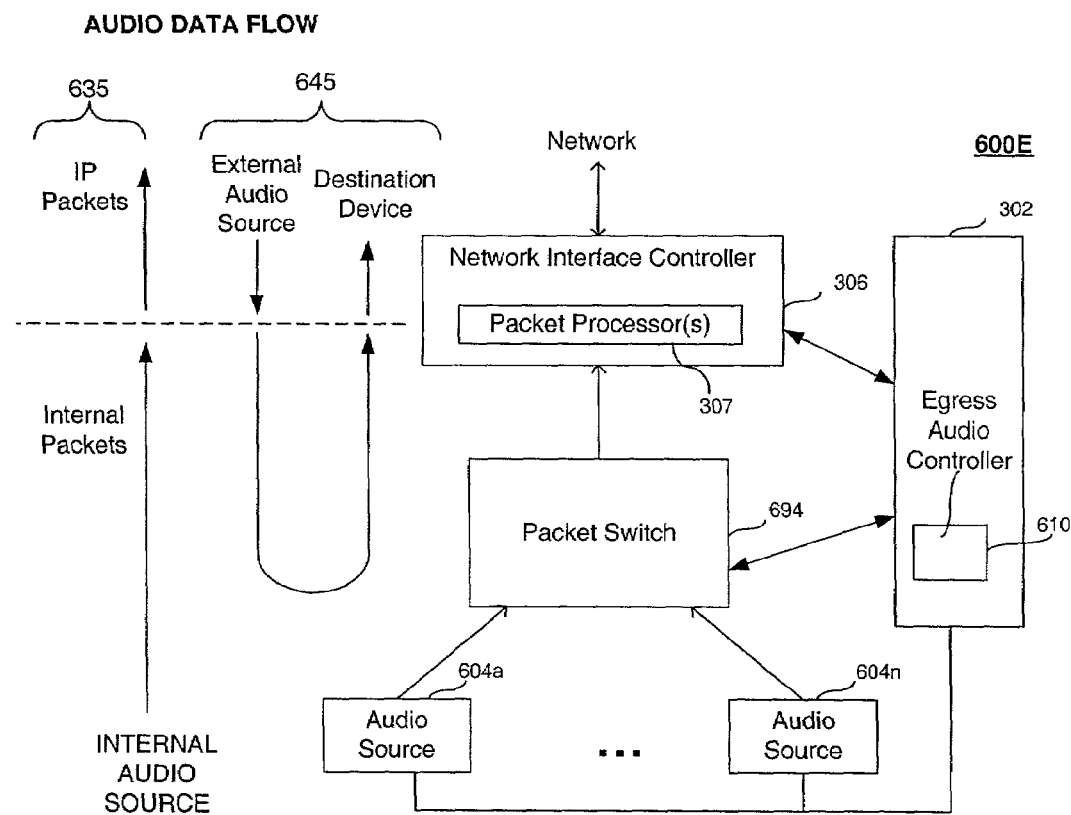

FIG. 6E is diagram of audio data flows 635,645 in a noiseless switch over system 600E that carries out packet switching between independent egress audio streams generated by internal and/or external audio sources according to an embodiment of the present invention. Noiseless switch over system 600E operates similar to systems 600A and 600C described in detail above except that a packet switch 694 is used instead of a cell switch 304. In this embodiment, a cell layer including SARs 630, 632, 634 is omitted. In audio data flow 635, internal packets flow through the packet switch 694 from internal audio sources 604a–n to packet processors 307. IP packets flow out to the network. In audio data flow 645, IP packets from an external audio source (not shown) are received at NIC 306. The audio is received in packets and buffered at NIC 306 as shown in FIG. 6E. NIC 306 strips IP information (stores it in forward table entry associated with external audio source and destination device) and generates internal packets assigned to a SVC (or other type of path) associated with the destination device. The internal packets are routed on the SVC through packet switch 694 to NIC 306. As described above, the internal packets are then processed by packet processor 307 to create IP packets with synchronized header information. NIC 306 then sends the IP packets to destination device. In this way, a user at the destination device is noiselessly switched over to receive audio from an external audio source.

Figure 6F:
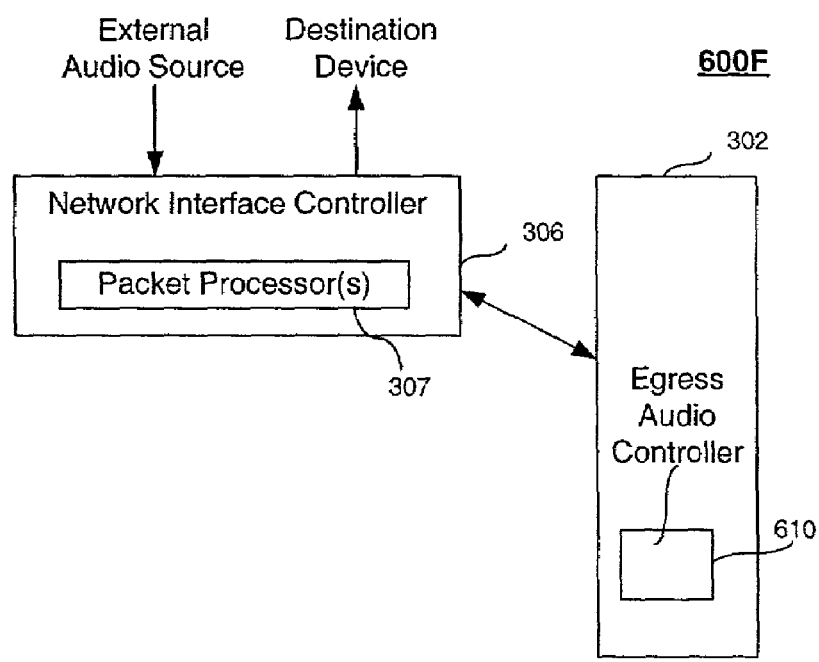

FIG. 6F is diagram of a noiseless switch over system 600F that carries out switching between independent egress audio streams generated by only external audio sources according to an embodiment of the present invention. No switch or internal audio sources are required. NIC 306 strips IP information (stores it in forward table entry associated with external audio source and destination device) and generates internal packets assigned to a SVC (or other type of path) associated with the destination device. The internal packets are routed on the SVC to NIC 306. (NIC 306 can be a common source and destination point). As described above, the internal packets are then processed by packet processor 307 to create IP packets with synchronized header information. NIC 306 then sends the IP packets to destination device. In this way, a user at the destination device is noiselessly switched over to receive audio from an external audio source.

X. Control Logic

Functionality described above with respect to the operation of egress audio switching system 600 can be implemented in control logic. Such control logic can be implemented in software, firmware, hardware or any combination thereof.

XI. CONCLUSION

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for noiselessly switching audio provided on an egress audio channel over a network, comprising:
   (a) generating a first audio stream of egress packets for the egress audio channel, wherein each egress packet includes a payload carrying audio and control header information;
   (b) switching in a packet switch said first audio stream of egress packets for delivery to a first network interface controller associated with the egress audio channel;
   (c) generating a second audio stream of egress packets, wherein each egress packet includes a payload carrying audio and control header information;
   (d) switching in said packet switch said second audio stream of egress packets for delivery to the first network interface controller associated with the egress audio channel; and
   (e) evaluating the relative priority of the first and second audio streams based on priority information in the control header information of the egress packets to determine which of the first and second audio streams is a higher priority audio stream to transmit on the egress audio channel over the network.

2. The method of claim 1, further comprising:
packetizing the higher priority audio stream to create an output egress audio stream of packets with synchronized header information; and
transmitting the output egress audio stream of packets on the egress audio channel over the network.

3. The method of claim 1, further comprising:
packetizing the lower priority audio stream to create an output egress audio stream of packets with synchronized header information, whereby, synchronized header information is noiselessly preserved in IP packets transmitted on the egress audio channel over the network for audio from both of the first and second audio streams.

4. The method of claim 1, further comprising:
converting the first audio stream of egress packets into first cells; and
converting the second audio stream of egress packets into second cells; wherein said switching step (b) comprises switching the converted first cells to a SVC associated with the egress audio channel, and said switching step (d) comprises switching the converted second cells to the SVC associated with the egress audio channel.

5. The method of claim 2, wherein said synchronized header information comprises valid RTP information.

6. The method of claim 1, further comprising:
   (f) determining synchronized RTP header information for each of the first and second audio streams prior to transmitting IP packets containing audio payloads of the respective first and second audio streams on the egress audio channel over the network.

7. A method for noiselessly switching audio from a second audio source to an egress audio channel already carrying audio from a first audio source, comprising:
- generating an audio stream of egress packets at the second audio source;
- converting the audio stream of egress packets into cells;
- switching the converted cells to a switched virtual circuit (SVC) associated with the egress audio channel;
- converting the switched cells back to the audio stream of egress packets;
- packetizing the audio stream to create an output egress audio stream of packets with synchronized header information; and
- transmitting the output egress audio stream of packets on the egress audio channel over a network in place of the audio from the first audio source.

8. The method of claim 7, wherein said generating step generates an audio stream of egress packets at the second audio source in response to a call event.

9. The method of claim 7, wherein said generating step generates an audio stream of egress packets at the second audio source in response to a call event, the audio stream of egress packets including a type of audio selected from at least one of voice, music, tones, or sound.

10. The method of claim 9, further comprising generating the call event based on at least one of the following conditions: an emergency condition, a call signaling condition, a call event based on callee or caller information, or a request for audio information.

11. The method of claim 9, further comprising generating the call event based on a request for audio information, wherein the request for audio information includes at least one of a request for advertisements, news, sports, financial, music or other audio content.

12. A method for introducing noiseless switch over audio for voice over the Internet (VOIP) telephone calls, comprising:
- establishing a VOIP telephone call between a destination device and a media server;
- setting priority information for a first audio source;
- delivering a first audio stream of egress packets that includes the set priority information;
- determining a call status with respect to availability of receiving noiseless switch over audio; and
- processing a call event that includes noiseless switch over audio when the call status determining step indicates the established VOIP telephone call is a candidate for receiving noiseless switch over audio.

13. The method of claim 12, wherein said processing step includes:
- determining priority information for the noiseless switch over audio; and
- transmitting the noiseless switch over audio in an output audio stream of packets in the established VOIP telephone call when the determined priority information for the noiseless switch over audio is greater than the set priority information of the first audio stream.

14. The method of claim 13, further comprising:
- generating a second audio stream of egress packets at a second audio source, the audio stream having the noiseless switch over audio in payloads;
- converting the second audio stream of egress packets into cells;
- switching the converted cells to a SVC associated with an egress audio channel of the established VOIP telephone call;
- converting the switched cells back to the second audio stream of egress packets;
- packetizing the second audio stream with synchronized header information to create the output audio stream of packets in the established VOIP telephone call; and
- transmitting the output audio stream of packets on the egress audio channel in the established VOIP telephone call over a network in place of the audio from the first audio source.

15. A system for noiselessly switching audio provided in a session on an egress audio channel over a network, comprising:
- first and second internal audio sources;
- a packet switch coupled to said first and second internal audio sources; and
- a network interface controller coupled to said packet switch, wherein
- said first internal audio source generates a first internal audio stream of egress packets for the egress audio channel, wherein each egress packet includes a payload carrying audio and control header information,
- said second internal audio source generates a second internal audio stream of egress packets, wherein each egress packet includes a payload carrying audio and control header information, said packet switch switches said first internal audio stream of egress packets and said second internal audio stream of egress packets for delivery to said network interface controller which controls the transmission of synchronous packets carrying audio from the first and second internal audio streams on the egress audio channel for the session over the network, and said network interface controller keeps header information of IP/RTP packets associated with said egress packets for the session in sequence.

16. The system of claim 15, further comprising:
- an egress audio controller coupled to said second internal audio source, wherein said egress audio controller sends a control signal to said second internal audio source to initiate the generation of said second audio stream.

17. A system for noiselessly switching audio provided on an egress audio channel over a network, comprising:
- first and second internal audio sources;
- a switch coupled to said first and second internal audio sources; and
- a network interface controller coupled to said switch, wherein
- said first internal audio source generates a first internal audio stream of egress packets for the egress audio channel, wherein each egress packet includes a payload carrying audio, and control header information,
- said second internal audio source generates a second internal audio stream of egress packets, wherein each egress packet includes a payload carrying audio and control header information, and said switch switches and delivers said first and second internal audio streams to said network interface controller; and
- an egress audio controller coupled to said second internal audio source, wherein said egress audio controller sends a control signal to said second internal audio source to initiate the generation of said second audio stream,
  - wherein said egress audio controller is further coupled to said first internal audio source, said switch, and said network interface controller, and wherein said egress audio controller sends a control signal to said first internal audio source to initiate the generation of said first internal audio stream when a VOIP telephone call is established, sends a control signal to said switch identifying said network interface controller as being associated with an egress audio output channel associated with the established VOIP telephone call, and sends a control signal to said network interface controller as being associated with an egress audio output channel associated with the established VOIP telephone call.

18. A system for noiselessly switching audio provided on an egress audio channel over a network, comprising:
  first and second internal audio sources;
  a packet switch coupled to said first and second internal audio sources; and
  a network interface controller coupled to said packet switch, wherein
  said first internal audio source generates a first internal audio stream of egress packets for the egress audio channel, wherein each egress packet includes a payload carrying audio and control header information,
  said second internal audio source generates a second internal audio stream of egress packets, wherein each egress packet includes a payload carrying audio and control header information, and said packet switch switches said first internal audio stream of egress packets and said second internal audio stream of egress packets for delivery to said network interface controller; and
  an egress audio controller coupled to said second internal audio source, wherein said egress audio controller sends a control signal to said second internal audio source to initiate the generation of said second audio stream,
  wherein said egress audio controller is further coupled to said first audio source, and wherein said egress audio controller sends control signals to said first and second internal audio sources to set priority information in said first and second audio streams.

19. A system for noiselessly switching audio provided in a session on an egress audio channel over a network, comprising:
  first and second internal audio sources;
  a packet switch coupled to said first and second internal audio sources; and
  a network interface controller coupled to said packet switch, wherein
  said first internal audio source generates a first internal audio stream of egress packets for the egress audio channel, wherein each egress packet includes a payload carrying audio and control header information,
  said second internal audio source generates a second internal audio stream of egress packets, wherein each egress packet includes a payload carrying audio and control header information, said packet switch switches said first audio stream of egress packets and said second audio stream of egress packets for delivery to said network interface controller, and said network interface controller keeps header information of IP/RTP packets associated with said egress packets for the session in sequence; and
  at least one packet processor that generates IP packets having synchronized header information and audio payloads, the audio payloads including audio payloads carried in said first and second audio streams.

20. A system for noiselessly switching audio provided on an egress audio channel over a network, comprising:
  first and second internal audio sources;
  a packet switch coupled to said first and second internal audio sources; and
  a network interface controller coupled to said packet switch, wherein
  said first internal audio source generates a first internal audio stream of egress packets for the egress audio channel, wherein each egress packet includes a payload carrying audio, and control header information,
  said second internal audio source generates a second internal audio stream of egress packets, wherein each egress packet includes a payload carrying audio and control header information, and said packet switch switches said first internal audio stream of egress packets and said second internal audio stream of egress packets for delivery to said network interface controller; and
  at least one packet processor that generates IP packets having synchronized header information and audio payloads, the audio payloads including audio payloads carried in said first and second audio streams,
  wherein said network interface controller dynamically selects which of the IP packets to transmit based on the relative priority of the first and second internal audio streams.

21. The system of claim 15, wherein at least one of said first internal audio source and said second internal audio source internally generates the audio for said respective first and second audio streams.

22. The system of claim 15, wherein at least one of said first internal audio source and said second internal audio source converts audio from an external source to generate the audio for said respective first and second audio streams.

23. A system for noiselessly switching audio from a first audio source to a second audio source on an egress audio channel already carrying audio from the first audio source, comprising:
  means for generating an audio stream of egress packets at the second audio source;
  means for converting the audio stream of egress packets into cells;
  means for switching the converted cells to a SVC associated with the egress audio channel;
  means for converting the switched cells back to the audio stream of egress packets;
  means for packetizing the audio stream to create an output egress audio stream of packets; and
  means for transmitting the output egress audio stream of packets on the egress audio channel over a network in place of the audio from the first audio source.

24. A system for introducing noiseless switch over audio for voice over the Internet (VOIP) telephone calls, comprising:
  means for establishing a VOIP telephone call between a destination device and a media server;
  means for setting priority information for a first internal audio source and a second internal audio source;
  means for delivering a first and second internal audio streams stream of egress packets that include the respective set priority information;
  means for determining a call status with respect to availability of receiving noiseless switch over audio; and
  means for processing a call event that includes an audio stream noiselessly switched between the first and second internal audio streams based on the set priority information when the call status determining step indicates the established VOIP telephone call is a candidate for receiving noiseless switch over audio.

25. A system for introducing noiseless switch over audio for voice over the Internet (VOIP) telephone calls, comprising:
- means for establishing a VOIP telephone call between a destination device and a media server;
- means for setting priority information for a first audio source;
- means for delivering a first audio stream of egress packets that includes the set priority information;
- means for determining a call status with respect to availability of receiving noiseless switch over audio; and
- means for processing a call event that includes noiseless switch over audio when the call status determining step indicates the established VOIP telephone call is a candidate for receiving noiseless switch over audio, wherein said processing means includes:
  - means for determining priority information for the noiseless switch over audio; and means for transmitting the noiseless switch over audio in an output audio stream of packets having synchronized header information in the established VOIP telephone call when the determined priority information for the switch over audio is greater than the set priority information of the first audio stream.

26. The system of claim 25, further comprising:
- means for generating a second audio stream of egress packets at a second audio source, the audio stream having the noiseless switch over audio;
- means for converting the second audio stream of egress packets into cells;
- means for switching the converted cells to a SVC associated with an egress audio channel of the established VOIP telephone call;
- means for converting the switched cells back to the second audio stream of egress packets;
- means for packetizing the second audio stream to create the output audio stream of packets in the established VOIP telephone call; and
- means for transmitting the output audio stream of packets on the egress audio channel in the established VOIP telephone call over a network in place of the audio from the first audio source.

27. A method for noiseless switching between internal audio sources in a VOIP network, comprising:
- (A) establishing a VOIP call between an origination device and a destination device;
- (B) selecting one audio source internal to the origination device;
- (C) transmitting audio from the selected one audio source in an output audio stream of packets with synchronized header information to the destination device during the VOIP call;
- (D) selecting another audio source internal to the origination device;
- (E) noiselessly switching from the one audio source to the another audio source; and
- (F) transmitting audio from the selected another audio source in the output audio stream of packets with synchronized header information to the destination device during the VOIP call.

28. The method of claim 27, further comprising generating audio payloads for the output audio stream of packets prior to said transmitting step (C).

29. The method of claim 27, wherein the another audio source receives an audio stream from an external audio source, and further comprising extracting audio payloads for the output audio stream of packets from IP packets generated at the external audio source prior to said transmitting step (C).

30. A method, comprising:
- (A) transmitting audio from a first internal independent audio source in an output audio stream of packets with synchronized header information during a VOIP call to a destination device; and
- (B) transmitting audio from a second internal independent audio source in an the output audio stream of packets with synchronized header information during the VOIP call to the destination device, whereby a user at the destination device perceives a noiseless switch over between transmitted audio from the first and second internal independent audio sources.

31. A system, comprising:
- (A) means for transmitting audio from a first internal independent audio source in an output audio stream of packets with synchronized header information during a VOIP call to a destination device; and
- (B) means for transmitting audio from a second internal independent audio source in the output audio stream of packets with synchronized header information during the VOIP call to the destination device, whereby a user at the destination device perceives a noiseless switch over between transmitted audio from first and second internal independent audio sources.

* * * * *